United States Patent
Harguindeguy et al.

(10) Patent No.: US 11,843,605 B2
(45) Date of Patent: *Dec. 12, 2023

(54) METHODS AND SYSTEMS FOR DATA TRAFFIC BASED ADAPTIVE SECURITY

(71) Applicant: Ping Identity Corporation, Denver, CO (US)

(72) Inventors: Bernard Harguindeguy, Atherton, CA (US); Udayakumar Subbarayan, Bangalore (IN); Isidore Rosenblum, Pleasanton, CA (US); Abduraheem Poonthiruthi, Bangalore (IN); Anoop Krishnan Gopalakrishnan, Bangalore (IN); Ashwani Kumar, Bengaluru (IN)

(73) Assignee: Ping Identity Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,240

(22) Filed: Oct. 31, 2022

(65) Prior Publication Data
US 2023/0231852 A1 Jul. 20, 2023

Related U.S. Application Data

(63) Continuation of application No. 16/733,570, filed on Jan. 3, 2020, now Pat. No. 11,496,475.

(30) Foreign Application Priority Data

Jan. 4, 2019 (IN) .............................. 201911000540

(51) Int. Cl.
*H04L 9/40* (2022.01)
(52) U.S. Cl.
CPC ........ *H04L 63/101* (2013.01); *H04L 63/0807* (2013.01); *H04L 63/0884* (2013.01); *H04L 63/1425* (2013.01)

(58) Field of Classification Search
CPC ............... H04L 63/101; H04L 63/0807; H04L 63/0884; H04L 63/1425
See application file for complete search history.

(56) References Cited

U.S. PATENT DOCUMENTS

| | | | |
|---|---|---|---|
| 6,336,117 | B1 | 1/2002 | Massarani |
| 7,209,962 | B2 | 4/2007 | Boden |

(Continued)

FOREIGN PATENT DOCUMENTS

| | | | | |
|---|---|---|---|---|
| EP | 2715540 A1 | 4/2014 | | |
| EP | 3678348 A1 | * 7/2020 | ......... | H04L 63/0227 |

(Continued)

OTHER PUBLICATIONS

Bashar, A., "Autonomic scaling of cloud computing resources using BN-based prediction models," 2013 IEEE 2nd International Conference on Cloud Networking (CloudNet): Short Paper, IEEE, 2013, pp. 200-204.

(Continued)

*Primary Examiner* — Yonas A Bayou
(74) *Attorney, Agent, or Firm* — COOLEY LLP

(57) ABSTRACT

The present disclosure relates to traffic monitoring through one or more access control servers configured for (i) routing server resource request messages to resource server(s), (ii) extracting information identifying a target server resource from data packets corresponding to one or more received server resource request messages, and (iii) selectively transmitting the received server resource request message to a resource server. The security server(s) is configured to receive a server resource request message data extracted from a server resource request message and initiate a first security response, wherein the initiated first security response is dependent on analysis of the server resource request message data. Responsive to identifying an indicator of compromise or that an originating terminal corresponding (Continued)

to the server resource request is identified within a blacklist, the first security response comprises non-transmission of at least one server resource request message by the access control server to a resource server.

20 Claims, 20 Drawing Sheets

(56) References Cited

U.S. PATENT DOCUMENTS

| | | | |
|---|---|---|---|
| 7,716,274 | B1 | 5/2010 | Kumar |
| 7,743,089 | B2 | 6/2010 | Putzolu |
| 8,339,959 | B1 | 12/2012 | Moisand et al. |
| 8,892,665 | B1 | 11/2014 | Rostami-Hesarsorkh et al. |
| 8,949,828 | B2 | 2/2015 | Pafumi et al. |
| 8,973,088 | B1 | 3/2015 | Leung et al. |
| 8,990,942 | B2 | 3/2015 | Thakadu et al. |
| 9,305,328 | B2 | 4/2016 | Mahajan et al. |
| 9,307,017 | B2 | 4/2016 | Wang et al. |
| 9,413,560 | B2 | 8/2016 | Patil et al. |
| 9,443,079 | B2 | 9/2016 | Reierson et al. |
| 9,516,053 | B1 | 12/2016 | Muddu et al. |
| 9,537,756 | B2 | 1/2017 | Bahadur et al. |
| 9,773,112 | B1 | 9/2017 | Rathor et al. |
| 9,935,829 | B1 | 4/2018 | Miller et al. |
| 9,948,703 | B2 | 4/2018 | Olivier et al. |
| 10,025,873 | B2 | 7/2018 | Jackson et al. |
| 10,038,742 | B2 | 7/2018 | Reddy et al. |
| 10,193,867 | B2 | 1/2019 | Subbarayan et al. |
| 10,484,337 | B2 | 11/2019 | Subbarayan et al. |
| 10,511,574 | B2 * | 12/2019 | Poliashenko ......... H04L 63/205 |
| 10,587,580 | B2 | 3/2020 | Subbarayan et al. |
| 10,666,621 | B2 | 5/2020 | Subbarayan et al. |
| 10,681,012 | B2 * | 6/2020 | Subbarayan ............ G06F 21/55 |
| 10,699,010 | B2 * | 6/2020 | Subbarayan .......... G06F 40/216 |
| 10,701,037 | B2 | 6/2020 | Subbarayan et al. |
| 10,726,491 | B1 | 7/2020 | Hockey et al. |
| 10,834,054 | B2 | 11/2020 | Subbarayan et al. |
| 10,909,241 | B2 * | 2/2021 | Puri ...................... G06N 20/00 |
| 11,075,885 | B2 * | 7/2021 | Subbarayan ........... H04L 63/02 |
| 11,140,135 | B2 | 10/2021 | Subbarayan et al. |
| 11,263,321 | B2 | 3/2022 | Subbarayan et al. |
| 11,272,026 | B2 * | 3/2022 | Walsh ................. H04L 41/0803 |
| 11,272,036 | B2 * | 3/2022 | Li ...................... H04M 7/0012 |
| 11,336,661 | B2 | 5/2022 | Boulton |
| 11,411,923 | B2 | 8/2022 | Subbarayan et al. |
| 11,496,475 | B2 | 11/2022 | Harguindeguy et al. |
| 11,582,199 | B2 | 2/2023 | Subbarayan et al. |
| 2001/0039586 | A1 | 11/2001 | Primak et al. |
| 2002/0112189 | A1 | 8/2002 | Syvanne et al. |
| 2003/0110172 | A1 | 6/2003 | Selman et al. |
| 2005/0015471 | A1 | 1/2005 | Zhang et al. |
| 2005/0027862 | A1 | 2/2005 | Nguyen et al. |
| 2005/0165902 | A1 | 7/2005 | Hellenthal et al. |
| 2005/0249199 | A1 | 11/2005 | Albert et al. |
| 2006/0159082 | A1 | 7/2006 | Cook et al. |
| 2006/0184661 | A1 | 8/2006 | Weisman et al. |
| 2006/0248294 | A1 | 11/2006 | Nedved et al. |
| 2007/0156919 | A1 | 7/2007 | Potti et al. |
| 2007/0165622 | A1 | 7/2007 | O'Rourke et al. |
| 2007/0192506 | A1 | 8/2007 | Gupta et al. |
| 2007/0282979 | A1 | 12/2007 | Tuel |
| 2008/0016339 | A1 | 1/2008 | Shukla |
| 2008/0263654 | A1 | 10/2008 | Bahl et al. |
| 2008/0276234 | A1 | 11/2008 | Taylor et al. |
| 2008/0320582 | A1 | 12/2008 | Chen et al. |
| 2009/0040926 | A1 | 2/2009 | Li et al. |
| 2009/0067440 | A1 | 3/2009 | Chadda et al. |
| 2009/0235067 | A1 | 9/2009 | Miller et al. |
| 2009/0327459 | A1 | 12/2009 | Yoo et al. |
| 2010/0333111 | A1 | 12/2010 | Kothamasu et al. |
| 2011/0119374 | A1 | 5/2011 | Ruhl et al. |
| 2011/0145842 | A1 | 6/2011 | Tofighbakhsh et al. |
| 2011/0295957 | A1 | 12/2011 | Ananthanarayanan et al. |
| 2012/0054131 | A1 | 3/2012 | Williamson |
| 2012/0059939 | A1 | 3/2012 | Chandrasekaran et al. |
| 2012/0110603 | A1 | 5/2012 | Kaneko et al. |
| 2012/0131639 | A1 | 5/2012 | Alex et al. |
| 2012/0179819 | A1 | 7/2012 | Hanson et al. |
| 2012/0226820 | A1 | 9/2012 | Li et al. |
| 2012/0233668 | A1 | 9/2012 | Leafe et al. |
| 2012/0290511 | A1 | 11/2012 | Frank et al. |
| 2012/0304244 | A1 | 11/2012 | Xie et al. |
| 2013/0031403 | A1 | 1/2013 | Mordani et al. |
| 2013/0044764 | A1 | 2/2013 | Casado et al. |
| 2013/0054822 | A1 | 2/2013 | Mordani et al. |
| 2013/0179947 | A1 | 7/2013 | Kline, III et al. |
| 2013/0205028 | A1 | 8/2013 | Crockett et al. |
| 2013/0227091 | A1 | 8/2013 | Tompkins |
| 2013/0339548 | A1 | 12/2013 | Gopinath et al. |
| 2014/0012966 | A1 | 1/2014 | Baphna et al. |
| 2014/0019626 | A1 | 1/2014 | Hubler et al. |
| 2014/0025986 | A1 | 1/2014 | Kalyanaraman et al. |
| 2014/0059226 | A1 | 2/2014 | Messerli et al. |
| 2014/0149590 | A1 | 5/2014 | Mallipeddi et al. |
| 2014/0149605 | A1 | 5/2014 | Annamalaisami et al. |
| 2014/0156836 | A1 | 6/2014 | Demmer et al. |
| 2014/0237594 | A1 | 8/2014 | Thakadu et al. |
| 2014/0258771 | A1 | 9/2014 | Xie et al. |
| 2014/0280595 | A1 | 9/2014 | Mani et al. |
| 2014/0280988 | A1 | 9/2014 | Reynolds et al. |
| 2014/0304352 | A1 | 10/2014 | Chaudhary et al. |
| 2014/0337268 | A1 | 11/2014 | Bhattacharya et al. |
| 2014/0344326 | A1 | 11/2014 | Kamath et al. |
| 2014/0362681 | A1 | 12/2014 | Bahadur et al. |
| 2014/0380087 | A1 | 12/2014 | Jamjoom et al. |
| 2015/0026794 | A1 | 1/2015 | Zuk et al. |
| 2015/0095887 | A1 | 4/2015 | Bhattacharya |
| 2015/0128103 | A1 | 5/2015 | Stratton et al. |
| 2015/0128274 | A1 | 5/2015 | Giokas |
| 2015/0161390 | A1 | 6/2015 | Xuan |
| 2015/0180894 | A1 | 6/2015 | Sadovsky et al. |
| 2015/0188760 | A1 | 7/2015 | Anumala et al. |
| 2015/0188808 | A1 | 7/2015 | Ghanwani et al. |
| 2015/0220376 | A1 | 8/2015 | Srivastava |
| 2015/0229579 | A1 | 8/2015 | Kosim-Satyaputra et al. |
| 2015/0234639 | A1 | 8/2015 | Allsbrook |
| 2015/0312102 | A1 | 10/2015 | Backholm et al. |
| 2015/0319136 | A1 * | 11/2015 | Xie ...................... H04L 63/145 726/11 |
| 2015/0319226 | A1 | 11/2015 | Mahmood |
| 2015/0358344 | A1 | 12/2015 | Mumcuoglu et al. |
| 2015/0372938 | A1 | 12/2015 | Patel et al. |
| 2016/0011732 | A1 | 1/2016 | Yang |
| 2016/0036862 | A1 | 2/2016 | Bagepalli et al. |
| 2016/0057173 | A1 | 2/2016 | Singman et al. |
| 2016/0065672 | A1 | 3/2016 | Savage et al. |
| 2016/0088023 | A1 | 3/2016 | Handa et al. |
| 2016/0092297 | A1 | 3/2016 | Mazon et al. |
| 2016/0098265 | A1 | 4/2016 | Mahajan et al. |
| 2016/0205519 | A1 | 7/2016 | Patel et al. |
| 2016/0234168 | A1 | 8/2016 | Leung et al. |
| 2016/0248812 | A1 | 8/2016 | Desai et al. |
| 2016/0308721 | A1 | 10/2016 | Dellisanti et al. |
| 2016/0308900 | A1 | 10/2016 | Sadika et al. |
| 2016/0337474 | A1 | 11/2016 | Rao |
| 2016/0352588 | A1 | 12/2016 | Subbarayan et al. |
| 2016/0352867 | A1 | 12/2016 | Subbarayan et al. |
| 2016/0366155 | A1 | 12/2016 | El-Moussa et al. |
| 2017/0012941 | A1 * | 1/2017 | Subbarayan ............ H04L 41/28 |
| 2017/0097901 | A1 | 4/2017 | Graves, Jr. et al. |
| 2017/0142100 | A1 | 5/2017 | Bollay et al. |
| 2017/0220798 | A1 | 8/2017 | Madou et al. |
| 2017/0289307 | A1 | 10/2017 | Thompson et al. |
| 2017/0302535 | A1 | 10/2017 | Lee |
| 2017/0308446 | A1 | 10/2017 | Kanso |
| 2017/0310708 | A1 | 10/2017 | Schiappa et al. |
| 2018/0027115 | A1 | 1/2018 | Kamboh et al. |
| 2018/0046475 | A1 | 2/2018 | Wei et al. |
| 2018/0109610 | A1 | 4/2018 | Einkauf et al. |
| 2018/0115523 | A1 * | 4/2018 | Subbarayan ........... G06N 20/00 |
| 2018/0115578 | A1 | 4/2018 | Subbarayan et al. |
| 2018/0173557 | A1 | 6/2018 | Nakil et al. |

(56) References Cited

U.S. PATENT DOCUMENTS

| | | |
|---|---|---|
| 2018/0183823 A1 | 6/2018 | Fadlil et al. |
| 2018/0278635 A1 | 9/2018 | Shin et al. |
| 2018/0285095 A1 | 10/2018 | Aw et al. |
| 2018/0337891 A1 | 11/2018 | Subbarayan et al. |
| 2018/0337892 A1 | 11/2018 | Subbarayan et al. |
| 2018/0337893 A1 | 11/2018 | Subbarayan et al. |
| 2018/0337894 A1 | 11/2018 | Subbarayan et al. |
| 2018/0367433 A1 | 12/2018 | Luna et al. |
| 2019/0005576 A1 | 1/2019 | Mick et al. |
| 2019/0020722 A1 | 1/2019 | Haraszti et al. |
| 2019/0034199 A1 | 1/2019 | Pollock |
| 2019/0114417 A1 | 4/2019 | Subbarayan et al. |
| 2019/0245876 A1 | 8/2019 | Faigon et al. |
| 2019/0258473 A1 | 8/2019 | Vishnepolsky et al. |
| 2020/0162433 A1 | 5/2020 | Subbarayan et al. |
| 2020/0177556 A1 | 6/2020 | Subbarayan et al. |
| 2020/0220875 A1* | 7/2020 | Harguindeguy ...... H04L 63/101 |
| 2020/0304470 A1 | 9/2020 | Subbarayan et al. |
| 2020/0336467 A1 | 10/2020 | Subbarayan et al. |
| 2021/0004460 A1 | 1/2021 | Subbarayan et al. |
| 2022/0021656 A1 | 1/2022 | Subbarayan et al. |
| 2022/0045990 A1 | 2/2022 | Subbarayan et al. |
| 2022/0217176 A1 | 7/2022 | Holloway et al. |
| 2022/0263708 A1 | 8/2022 | Ramachandran et al. |
| 2022/0292190 A1 | 9/2022 | Subbarayan et al. |
| 2023/0061142 A1 | 3/2023 | Subbarayan et al. |

FOREIGN PATENT DOCUMENTS

| | | |
|---|---|---|
| WO | WO-2012162102 A1 | 11/2012 |
| WO | WO-2016168368 A1 | 10/2016 |

OTHER PUBLICATIONS

Extended European Search Report for European Application No. 18200235.2, dated Feb. 11, 2019, 9 pages.

Extended European Search Report for European Application No. 20150237.4, dated May 27, 2020, 13 pages.

Extended European Search Report for European Application No. 22157218.3, dated May 13, 2022, 11 pages.

Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).

Hachinyan, O., "Detection of Malicious Software Based on Multiple Equations of API-call Sequences," Feb. 2017, IEEE, pp. 415-418.

Lu, S. et al., "Elastic scaling of virtual clusters in cloud data center networks," 2017 IEEE 36th International Performance Computing and Communications Conference (IPCCC), IEEE, 2017, 8 pages.

Niu, D. et al., "Quality-assured cloud bandwidth auto-scaling for video-on-demand applications," 2012 Proceedings IEEE INFOCOM, 9 pages.

Office Action for European Application No. 18200235.2, dated Jan. 30, 2020, 7 pages.

Office Action for European Application No. 18200235.2, dated Sep. 14, 2020, 8 pages.

Office Action for European Application No. 20150237.4, dated Apr. 13, 2021, 10 pages.

Office Action for U.S. Appl. No. 15/164,512, dated Aug. 15, 2019, 16 pages.

Office Action for U.S. Appl. No. 15/164,512, dated Feb. 28, 2019, 18 pages.

Office Action for U.S. Appl. No. 15/164,512, dated Jul. 6, 2018, 9 pages.

Office Action for U.S. Appl. No. 15/164,555, dated Jan. 9, 2019, 19 pages.

Office Action for U.S. Appl. No. 15/164,555, dated Oct. 24, 2019, 24 pages.

Office Action for U.S. Appl. No. 15/164,587, dated Feb. 22, 2018, 17 pages.

Office Action for U.S. Appl. No. 15/792,850, dated Aug. 8, 2019, 9 pages.

Office Action for U.S. Appl. No. 15/793,671, dated Jul. 8, 2019, 36 pages.

Office Action for U.S. Appl. No. 16/050,915, dated Sep. 6, 2019, 18 pages.

Office Action for U.S. Appl. No. 16/050,958, dated Dec. 31, 2018, 7 pages.

Office Action for U.S. Appl. No. 16/050,996, dated Nov. 16, 2018, 6 pages.

Office Action for U.S. Appl. No. 16/051,026, dated Dec. 13, 2018, 6 pages.

Office Action for U.S. Appl. No. 16/158,836, dated Nov. 18, 2019, 13 pages.

Office Action for U.S. Appl. No. 16/733,570, dated Sep. 21, 2021, 15 pages.

Office Action for U.S. Appl. No. 16/788,059, dated Oct. 19, 2020, 6 pages.

Office Action for U.S. Appl. No. 16/881,376, dated Jun. 24, 2022, 8 pages.

Office Action for U.S. Appl. No. 16/909,272, dated Jun. 24, 2021, 10 pages.

Office Action for U.S. Appl. No. 17/680,767, dated Dec. 7, 2022, 13 pages.

Office Action for U.S. Appl. No. 17/817,577 dated Apr. 12, 2023, 9 pages.

Uppal, D., et al., "Malware detection and classification based on extraction of API sequences," 2014 International Conference on Advances in Computing, Communications and Informatics (ICACCI), Delhi, India, 2014, pp. 2337-2342, doi: 10.1109/ICACCI.2014.6968547.

Wei, S., et al., "Mining network traffic for application category recognition on Android platform," 2015 IEEE International Conference on Progress in Informatics and Computing (PIC), Nanjing, China, 2015, pp. 409-413, doi: 10.11 09/PIC.2015.7489879.

Wikipedia: "Honeypot (computing)," Sep. 2007 (Sep. 1, 2007), XP007917443, Retrieved from the Internet: URL: http://en.wikipedia.org/w/index.php?title=Honeypot_(computing)&oldid=159801521, [retrieved on Mar. 3, 2011], 12 pages.

Xu, J. et al,. "Lightweight and Adaptive Service API Performance Monitoring in Highly Dynamic Cloud Environment," 2017 IEEE International Conference on Services Computing (SCC), 2017, pp. 35-43.

* cited by examiner

| Protocol Layer | OSI Layer | TCP/IP Layer |
|---|---|---|
| 7 | Application | Application (HTTP, HTTPS, WebSocket, WebSocket / Secure Socket Layer, MQTT, CoAP protocols) |
| 6 | Presentation | |
| 5 | Session | |
| 4 | Transport | Transport |
| 3 | Network | Internet |
| 2 | Data Link | Network Access |
| 1 | Physical | |

FIGURE 2

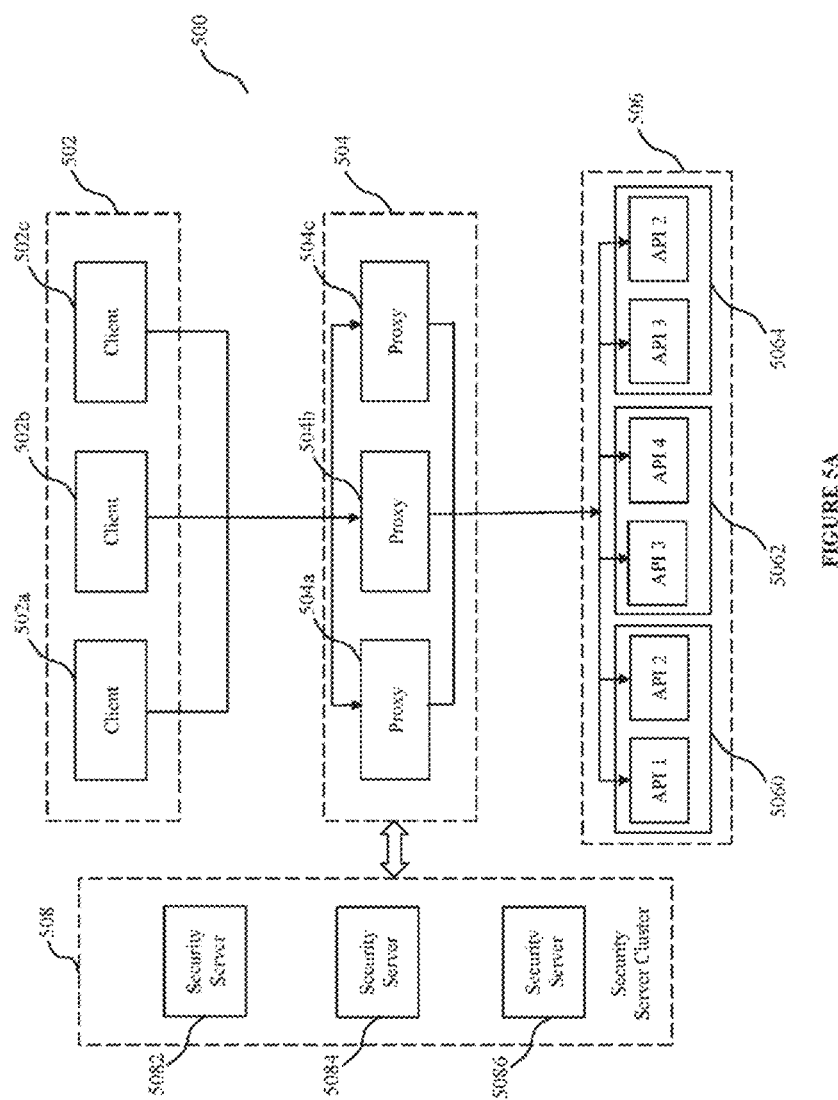

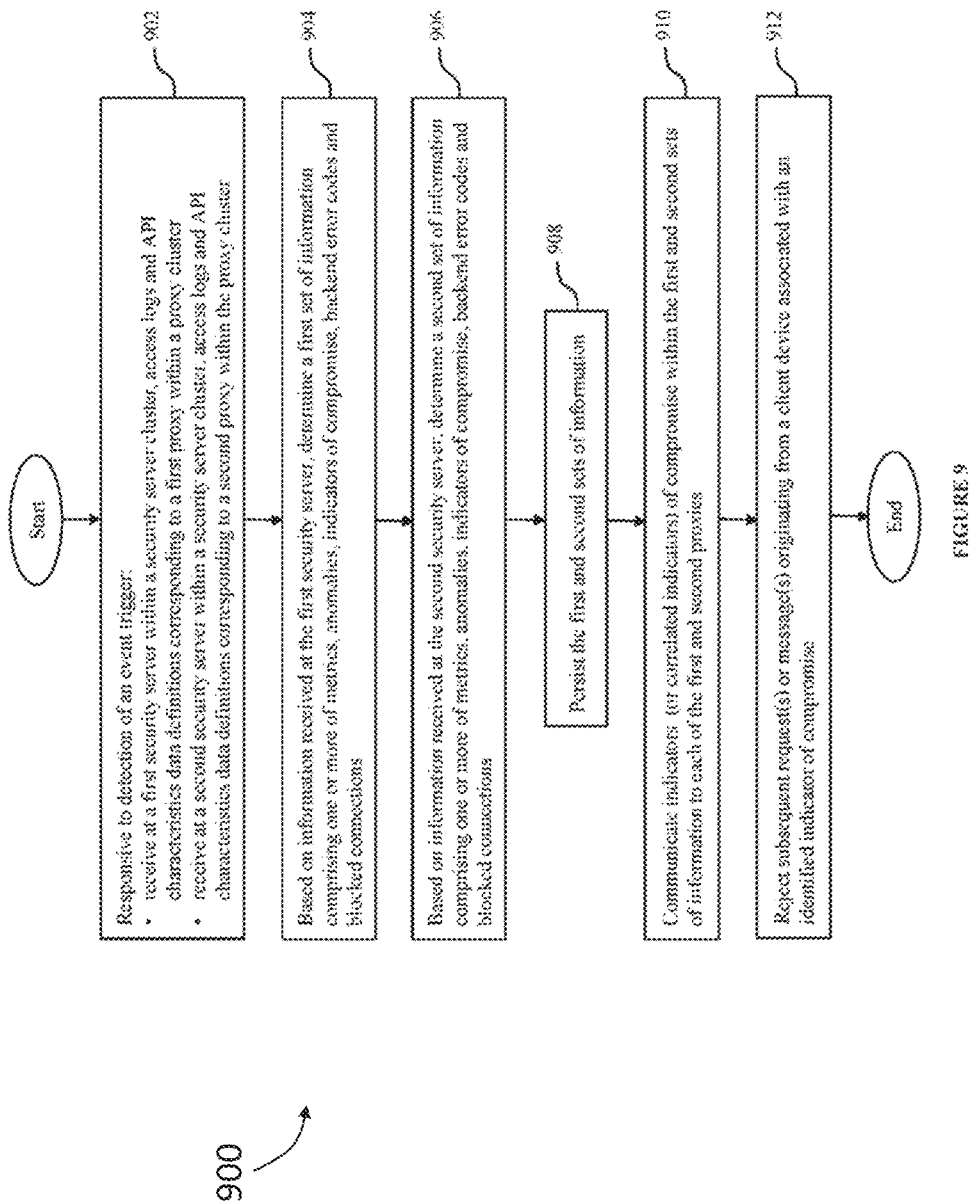

METHODS AND SYSTEMS FOR DATA TRAFFIC BASED ADAPTIVE SECURITY

CROSS-REFERENCE TO RELATED APPLICATIONS

This application is a continuation of U.S. patent application Ser. No. 16/733,570, filed Jan. 3, 2020, (now U.S. Pat. No. 11,496,475), which claims priority to and the benefit of Indian Patent Application No. 201911000540, filed Jan. 4, 2019, each entitled "Methods and Systems for Data Traffic Based Adaptive Security," the contents of each of which is incorporated herein by reference in its entirety.

FIELD OF INVENTION

The present invention relates to the domain of data traffic monitoring and resource server security. In particular, the invention enables data traffic monitoring and resource server security through access control server based traffic monitoring and security enforcement. In specific embodiments, the invention implements application programming interface (API) traffic monitoring for data analytics and API security purposes.

BACKGROUND OF THE INVENTION

Web applications, distributed applications and client-server applications, including those implemented using APIs, may use one or more proxy nodes (including, for example, servers, virtual machines, and Linux containers) interposed between clients and servers for routing, load balancing, and security, e.g., at the API layer. Proxy nodes of the above type distribute incoming client requests or messages among multiple servers to ensure one or more of targeted routing, balanced server utilization, minimized server overloads, and high availability.

Proxies of router or load balancer type receive client requests or messages, select an appropriate server(s) for processing the requests or messages, and transmit the requests or messages to the selected server(s).

Existing systems, however, include certain drawbacks. For example, implementing data analytics or security solutions at an individual server level has certain associated limitations. In particular, the pool of analyzed data is usually limited to data received at the individual server, thereby limiting the reliability and accuracy of the results of such analysis.

Additionally, implementing first level security analysis at the server level is a less than optimal solution, for the reason that a server usually receives a client request or message before it can determine whether such request or message comprises a security threat. The fact that a security threat is received at a server (thereby subjecting the server to the likelihood of damage) before the security threat can be identified or assessed presents challenges of its own to server security.

Existing API security solutions also face challenges in terms of big data characteristics of velocity (increasing bandwidth and increasing processing powers of devices resulting in increasing demand for web services and APIs), volume (increasing number of API requests from increasing number of users having increasing number of devices), variety (increasing number of available web services and APIs), and veracity (identifying source and security or authentication related parameters of web service access data and/or API access data).

There is accordingly a need for efficient data analytics and security solutions that protect a server backend from security threats. Additionally, it is desirable for the security solutions to be tailored for addressing the specific security requirements associated with big data capture, streaming and processing for protecting APIs at the edge of (i.e. at entry points of) cloud, and data centers using aggregated information from various endpoints.

SUMMARY

The present disclosure provides systems, devices, and methods for enabling traffic monitoring between clients and servers and server security through proxy-based traffic monitoring and security enforcement. In some embodiments, systems, devices, and methods described herein relate to API traffic monitoring and API server security.

In an embodiment, the present disclosure provides a proxy configured for routing client messages to one or more target APIs. The proxy comprises (i) a processor, (ii) a proxy router configured to (a) extract from data packets corresponding to a received client message, an API name and hostname corresponding to a target API, (b) compare the extracted API name against API names associated with each of a set of API characteristics data definitions, and (c) responsive to failure to identify an API characteristics data definition comprising an API name that matches the extracted API name, discard the received client message, without onward transmission to an API server identified in the received client message.

The proxy router may be further configured such that, in response to successful identification of an API characteristics data definition comprising an API name that matches the extracted API name, the proxy router (i) compares at least one of a communication protocol, protocol method and content type specified within the received client message against one or more permitted communication protocols, permitted protocol methods or permitted content types associated with the identified API characteristics data definition, and (ii) responsive to determining that at least one of the communication protocol, protocol method or content type specified within the received client message does not match permitted communication protocols, permitted protocol methods or permitted content types associated with the identified API characteristics data definition, discards the received client message without onward transmission to an API server identified in the received client message.

The proxy router may be configured such that responsive to discarding a received client message without onward transmission to an API server identified in the received client message, the proxy router returns an error message to a client associated with the discarded client message.

The present disclosure additionally provides a system for securing one or more API servers. The system comprises (i) a proxy cluster configured for routing client messages to at least one target API implemented on the one or more API servers, the proxy cluster comprising a networked plurality of proxies, wherein each of the plurality of proxies are configured to (a) extract information identifying a target API from data packets corresponding to a received client message, and transmit the received client message to an API server implementing the target API, and (b) responsive to receiving an indicator of compromise, discarding a received client message corresponding to a client or connection id associated with the received indicator of compromise, without onward transmission to an API server identified in the received client message, and (iii) a set of security servers comprising at least one security server, wherein the set of security servers are configured to identify one or more indicators of compromise, based on the data received from the proxies within the proxy cluster.

The set of security servers may be further configured for one or more of generating API metrics, generating blocked connection metrics, generating back end error code metrics, and identifying anomalies.

In an embodiment, the data received from the proxies at the set of security servers for identification of one or more indicators of compromise, includes (i) proxy access log information, and (ii) one or more of API characteristics data definitions, configuration data, session data and security data associated with the proxies.

In a system embodiment, proxy access log information may comprise one or more of (i) time stamp information corresponding to one or more communications received at or sent from a proxy, (ii) connection id of a client communicating with a proxy, (iii) connection id of a client communicating with an API server through a proxy, (iii) API name identified in a client request or message, (iv) API server to which a client message is transmitted by a proxy, and (v) IP address or port of a client.

API characteristics data definitions may comprise one or more of (i) client side name associated with an API, (ii) server side name associated with an API, (iii) hostname associated with an API, (iv) IP address of an API server, (v) TCP port associated with an API on an API server, (vi) login URL or secure URL associated with an API, (vii) cookie information, (viii) communication protocols supported by an API, (ix) protocol methods supported by an API, (x) content type supported by an API, and (xi) a data rate limit prescribed in connection with an API.

Configuration data may comprise one or more of (i) data port information or routing information corresponding an API server, (ii) load balancing or routing policies, (iii) load balancing or routing techniques, (iv) management ports, (v) maximum number of processes or threads for each port, (vi) policies for generating logs, and (vii) API security settings corresponding to an API server.

Session data may comprise one or more of (i) cookies, (ii) tokens, (iii) client ids and (iv) device ids.

Security data comprises one or more of (i) cipher suites, (ii) digital certificates, (iii) session keys and (iv) asymmetric and symmetric ciphers received at a proxy.

The present disclosure additionally provides a system for securing one or more API servers, the system comprising (i) a proxy cluster configured for routing client messages to at least one target API implemented on the one or more API servers, the proxy cluster comprising a networked plurality of proxies, wherein each of the plurality of proxies are configured to (a) extract information identifying a target API from data packets corresponding to a received client message, and transmit the received client message to an API server implementing the target API, and (b) responsive to receiving an indicator of compromise, discard a received client message corresponding to a client or connection id associated with the received indicator of compromise, without onward transmission to an API server identified in the received client message, and (ii) a cluster of security servers comprising (c) a first security server configured: to receive a first set of information comprising proxy access log information from at least a first proxy within the proxy cluster, and to analyse the first set of information for identifying a first set of indicators of compromise, and (d) a second security server configured: to receive a second set of information comprising proxy access log information from at least a second proxy within the proxy cluster, and to analyse the second set of information for identifying a second set of indicators of compromise.

In a system embodiment, the cluster of security servers comprises a scalable plurality of stateless security servers.

The system may persist the first set of indicators of compromise and the second set of indicators of compromise to a database.

Each of the plurality of proxies may be configured to receive the first set of indicators of compromise and the second set of indicators of compromise.

The first security server may additionally be configured such that the first set of information received from at least the first proxy includes one or more of API characteristics data definitions, configuration data, session data and security data associated with at least the first proxy.

The second security server may additionally be configured such that the second set of information received from at least the second proxy includes one or more of API characteristics data definitions, configuration data, session data and security data associated with at least the second proxy.

The first and second security servers may respectively be configured for one or more of generating API metrics, generating blocked connection metrics, generating back end error code metrics, and identifying anomalies.

The present disclosure provides a method for routing client messages to a target API, the method comprising (i) receiving a client message at a proxy router, (ii) extracting from data packets corresponding to the received client message, an API name and hostname corresponding to a target API, comparing the extracted API name against API names associated with each of a set of API characteristics data definitions, and (iv) responsive to a failure to identify an API characteristics data definition comprising an API name that matches the extracted API name, discarding the received client message, without onward transmission to an API server identified in the received client message.

The method may additionally responding to successful identification of an API characteristics data definition comprising an API name that matches the extracted API name, by (i) comparing at least one of a communication protocol, protocol method and content type specified within the received client message against one or more permitted communication protocols, permitted protocol methods or permitted content types associated with the identified API characteristics data definition, and (ii) responsive to determining that at least one of the communication protocol, protocol method or content type specified within the received client message does not match permitted communication protocols, permitted protocol methods or permitted content types associated with the identified API characteristics data definition, discarding the received client message without onward transmission to an API server identified in the received client message.

In a method embodiment, responsive to discarding a received client message without onward transmission to an API server identified in the received client message, an error message is returned to a client associated with the discarded client message.

The present disclosure additionally provides a method for securing one or more API servers, the method comprising (i) receiving at a security server, data from a plurality of proxies within a proxy cluster, wherein (a) the proxy cluster is configured for routing client messages to at least one target API implemented on the one or more API servers, and (b) each of the plurality of proxies are configured to extract information identifying a target API from data packets corresponding to a received client message, and to transmit the received client message to an API server implementing the target API, (ii) identifying at the security server, one or more indicators of compromise, based on the data received from proxies within the proxy cluster, and (iii) responsive to receiving an indicator of compromise identified by the security server at a proxy within the proxy cluster, discarding a received client message corresponding to a client or connection id associated with the received indicator of compromise at said proxy, without onward transmission of said client message to an API server.

The method may further comprise one or more of generating API metrics, generating blocked connection metrics, generating back end error code metrics, and identifying anomalies at the security server. In an embodiment of the method, the data received from the proxies within the proxy cluster, includes (i) proxy access log information, and (ii) one or more of API characteristics data definitions, configuration data, session data and security data associated with the proxies.

For the purposes of the method, examples of proxy access log information include one or more of (i) time stamp information corresponding to one or more communications received at or sent from a proxy, (ii) connection id of a client communicating with a proxy, (iii) connection id of a client communicating with an API server through a proxy, (iii) API name identified in a client request or message, (iv) API server to which a client message is transmitted by a proxy, and (v) IP address or port of a client. It will however be understood that the above instances of proxy access log information, are provided as examples and not exhaustive.

For the purposes of the method, API characteristics data definitions comprises one or more of (i) client side name associated with an API, (ii) server side name associated with an API, (iii) hostname associated with an API, (iv) IP address of an API server, (v) TCP port associated with an API on an API server, (vi) login URL or secure URL associated with an API, (vii) cookie information, (viii) communication protocols supported by an API, (ix) protocol methods supported by an API, (x) content type supported by an API, and (xi) a data rate limit prescribed in connection with an API. It will however be understood that the above instances of API characteristics data definitions, are provided as examples and not exhaustive.

For the purposes of the method, configuration data comprises one or more of (i) data port information or routing information corresponding an API server, (ii) load balancing or routing policies, (iii) load balancing or routing techniques, (iv) management ports, (v) maximum number of processes or threads for each port, (vi) policies for generating logs, and (vii) API security settings corresponding to an API server. It will however be understood that the above instances of configuration data, are provided as examples and not exhaustive.

For the purposes of the method, session data comprises one or more of (i) cookies, (ii) tokens, (iii) client ids and (iv) device ids. It will however be understood that the above instances of session data, are provided as examples and not exhaustive.

For the purposes of the method, security data comprises one or more of (i) cipher suites, (ii) digital certificates, (iii) session keys and (iv) asymmetric and symmetric ciphers received at a proxy. It will however be understood that the above instances of security data, are provided as examples and not exhaustive.

The present disclosure further presents a method for securing one or more API servers, comprising (i) receiving at a first security server within a cluster of security servers, a first set of information comprising proxy access log information from at least a first proxy within a proxy cluster, (ii) analysing the first set of information for identifying a first set of indicators of compromise, (iii) receiving at a second security server within the cluster of security servers, a second set of information comprising proxy access log information from at least a second proxy within the proxy cluster, (iv) analysing the second set of information for identifying a second set of indicators of compromise, and (v) responsive to receiving an indicator of compromise at a proxy within the proxy cluster, discarding a received client message corresponding to a client or connection id associated with the received indicator of compromise, without onward transmission to an API server identified in the received client message—wherein the proxy cluster comprises a networked plurality of proxies, wherein each of the plurality of proxies is configured to extract information identifying a target API from data packets corresponding to a received client message, and to transmit the received client message to an API server implementing the target API.

In a method embodiment, the first set of indicators of compromise and the second set of indicators of compromise are persisted to a database.

The method may further comprise receiving the first set of indicators of compromise and the second set of indicators of compromise at each of the first proxy and the second proxy.

In a method embodiment, (i) the first set of information received from at least the first proxy includes one or more of API characteristics data definitions, configuration data, session data and security data associated with at least the first proxy, and (ii) the second set of information received from at least the second proxy includes one or more of API characteristics data definitions, configuration data, session data and security data associated with at least the second proxy.

The method may further comprise one or more of generating API metrics, generating blocked connection metrics, generating back end error code metrics based on said first and second sets of information.

In a more specific embodiment, in acquiring at least one of the first set of information and the second set of information at least one data plane within the first proxy or second proxy has a plurality of sub-processes uniquely associated therewith. Capture of real time API traffic data routed through such data plane may comprise generating, for each sub-process associated with said data plane, a log uniquely corresponding to said sub-process, wherein said log comprises real time API traffic data routed by said sub-process.

It would be appreciated that receiving access logs and API characteristics data definitions (and optionally configuration data, session data or security data) from across a plurality of proxies within a proxy cluster, enables a security server or cluster of security servers to determine and consolidate metrics, anomalies, indicators of compromise, error codes and blocked connection information with a cluster wide perspective (i.e. across all nodes of the proxy cluster) instead of on a proxy specific basis—which improves the results of data analysis and for better identification of indicators of compromise.

The present disclosure additionally provides a computer program product for implementing methods in accordance with the present disclosure, comprising a non-transitory computer usable medium having a computer readable program code embodied therein, the computer readable program code comprising instructions for implementing the various method steps.

The present disclosure provides a method for securing one or more resource servers. The method comprises (i) receiving at a security server, server resource request message data extracted from a server resource request message received at an access control server, wherein said access control server is (a) configured for routing or forwarding server resource request messages to at least one target resource server, and (b) configured to extract information identifying a target server resource from data packets corresponding to one or more received server resource request messages, and to selectively transmit the received server resource request message to a resource server implementing the target server resource, and (ii) initiating a first security response at the security server, wherein (c) the initiated first security response is dependent on a result of analysis of the server resource request message data received at the security server, and (d) responsive to said analysis of the server resource request message data resulting in identification of an indicator of compromise by the security server or that an originating terminal corresponding to the server resource request is identified within a blacklist, said first security response comprises non-transmission of at least one server resource request message received from the originating terminal corresponding to the server resource request by the access control server to a resource server.

In an embodiment of the method, responsive to said analysis of the server resource request message data resulting in identification of an indicator of compromise by the security server or that an originating terminal corresponding to the server resource request is identified within a blacklist, said first security response comprises one of (i) non-transmission of the server resource request message received from the originating terminal corresponding to the server resource request by the access control server to a resource server, or (ii) transmission of the server resource request message received from the originating terminal corresponding to the server resource request by the access control server to a resource server, and non-transmission of at least one subsequent server resource request message received from said originating terminal by the access control server to the resource server, or (iii) transmission of the server resource request message received from the originating terminal corresponding to the server resource request by the access control server to a resource server, and non-transmission of at least one server resource response corresponding to the transmitted server resource request message or non-transmission of at least one server resource response corresponding to at least one subsequent server resource request message received from said originating terminal by the access control server.

The method may further comprise one or more of generating server resource metrics, generating blocked connection metrics, generating back end error code metrics, and identifying anomalies at the security server based on the server resource request message data received at the security server from the access control server.

The server resource request message data received at the security server may include at least one of (i) server resource access request log information stored at the access control server, (ii) server resource access request data transmitted from the access control server in real time, (iii) server resource characteristics data definitions, (iv) configuration data, (v) session data and (vi) security data associated with the access control server.

In a method embodiment, server resource access request data comprises one or more of (i) time stamp information corresponding to one or more communications received at or sent from an access control server, (ii) connection id of a client communicating with an access control server, (iii) connection id of a client communicating with a resource server through an access control server, (iii) server resource name identified in a client request or message, (iv) resource server to which a client message is transmitted by an access control server, and (v) IP address or port of a client; (vi) method or command used by a client in generating the server resource request message, (vii) URL and URL information, (viii) protocol information or version number, (ix) content type, (x) host accessed information, (xi) content length, (xii) client information, (xiii) user agent information, (xiv) API key, and (xv) authorization information including in form of a token or cookie or other data record.

In a method embodiment, server resource characteristics data definitions may comprise one or more of (i) client side name associated with a server resource, (ii) server side name associated with a server resource, (iii) hostname associated with a server resource, (iv) IP address of a server resource, (v) TCP port associated with a server resource on a resource server, (vi) login URL or secure URL associated with a server resource, (vii) cookie information, (viii) token information (ix) API key information, (x) communication protocols supported by a server resource, (xi) protocol methods supported by a server resource, (xii) content type supported by a server resource, and (xiii) a data rate limit prescribed in connection with a server resource;

In one embodiment, configuration data may comprise one or more of (i) data port information or routing information corresponding a resource server, (ii) load balancing or routing policies, (iii) load balancing or routing techniques, (iv) management ports, (v) maximum number of processes or threads for each port, (vi) policies for generating logs, and (vii) server resource security settings corresponding to a resource server.

In a particular embodiment of the method, session data comprises one or more of (i) cookies, (ii) tokens, (iii) client ids and (iv) device ids. In a further embodiment of the method, security data comprises one or more of (i) cipher suites, (ii) digital certificates, (iii) session keys and (iv) asymmetric and symmetric ciphers received at an access control server.

Responsive to said security server analysis of the server resource request message data indicating absence of indicators of compromise, the first security response may comprise transmission of the server resource request message to a resource server.

The method may include (i) receiving at the security server, server resource response message data extracted from a server resource response message received from the resource server that received the transmitted server resource request message, and (ii) initiating a second security response at the security server, wherein (a) the initiated second security response is dependent on a result of analysis of the server resource response message data received at the security server, and (b) responsive to said analysis of the server resource response message data resulting in identification of an indicator of compromise by the security server, said second security response comprises non-transmission of at least one server response message from the resource server or non-transmission of at least one subsequently received server resource request message received from the originating terminal.

In one embodiment of the method, responsive to said analysis of the server resource response message data resulting in identification of an indicator of compromise by the security server or that an originating terminal corresponding to the server resource request is identified within a blacklist, said second security response comprises one of (i) non-transmission of the server resource response message data by the access control server to a target terminal identified in the server resource response message data, or (ii) transmission of the server resource response message data by the access control server to a target terminal identified in the server resource response message data, and (a) non-transmission of at least one subsequent server resource response message received from said server resource for onward transmission to the same target terminal or (b) or non-transmission of at least one subsequently received server resource request message received from the originating terminal.

Responsive to said security server analysis of the server resource response message data indicating absence of indicators of compromise, said second security response comprises transmission of the server resource response message to the target client identified in said server resource response message.

In a method embodiment, analysis of the server resource request message data is preceded by identity authentication of the access control server from which the security server has received the server resource request message data. In another embodiment, analysis of the server resource response message data is preceded by identity authentication of the access control server from which the security server has received the server resource response message data.

The access control server may be communicably coupled to a security server cluster, and said access control server may be configured such that any server resource request message data and its corresponding server resource response message data are both transmitted to a same security server within the security server cluster.

The present disclosure additionally comprises a system for securing one or more resource servers. The system comprises at least one security server configured for initiating a first security response, wherein (i) the initiated first security response is dependent on a result of analysis of server resource request message data received at the security server from an access control server, and (ii) responsive to said analysis of the server resource request message data resulting in identification by the security server of an indicator of compromise or that an originating terminal corresponding to the server resource request is identified within a blacklist, said first security response comprises non-transmission of at least one server resource request message by the access control server to a resource server.

The access control server may be configured for (i) routing or forwarding client messages to at least one target server resource implemented on the one or more resource servers, (ii) extracting information identifying a target server resource from data packets corresponding to one or more received server resource request messages, (iii) transmitting to the security server, server resource request message data extracted from a received server resource request message received at the access control server, and (iv) selectively transmitting the received server resource request message to a resource server implementing the target server resource.

In a system embodiment, responsive to said analysis of the server resource request message data resulting in identification of an indicator of compromise by the security server or that an originating terminal corresponding to the server resource request is identified within a blacklist, said first security response comprises one of (i) non-transmission of the server resource request message received from the originating terminal corresponding to the server resource request by the access control server to a resource server, or (ii) transmission of the server resource request message received from the originating terminal corresponding to the server resource request by the access control server to a resource server, and non-transmission of at least one subsequent server resource request message received from said originating terminal by the access control server to the resource server, or (iii) transmission of the server resource request message received from the originating terminal corresponding to the server resource request by the access control server to a resource server, and non-transmission of at least one server resource response corresponding to the transmitted server resource request message or non-transmission of at least one server resource response corresponding to at least one subsequent server resource request message received from said originating terminal by the access control server.

The security server may be configured for one or more of generating server resource metrics, generating blocked connection metrics, generating back end error code metrics, and identifying anomalies based on the server resource request message data received at the security server from the access control server.

The server resource request message data received at the security server may include at least one of (i) server resource access request log information stored at the access control server, (ii) server resource access request data transmitted from the access control server in real time, (iii) server resource characteristics data definitions, (iv) configuration data, (v) session data and (vi) security data associated with the access control server.

In a system embodiment, server resource access request data comprises one or more of (i) time stamp information corresponding to one or more communications received at or sent from an access control server, (ii) connection id of a client communicating with an access control server, (iii) connection id of a client communicating with a resource server through an access control server, (iii) server resource name identified in a client request or message, (iv) resource server to which a client message is transmitted by an access control server, and (v) IP address or port of a client; (vi) method or command used by a client in generating the server resource request message, (vii) URL and URL information, (viii) protocol information or version number, (ix) content type, (x) host accessed information, (xi) content length, (xii) client information, (xiii) user agent information, (xiv) API key, and (xv) authorization information including in form of a token or cookie or other data record.

Server resource characteristics data definitions may comprise one or more of (i) client side name associated with a server resource, (ii) server side name associated with a server resource, (iii) hostname associated with a server resource, (iv) IP address of a server resource, (v) TCP port associated with a server resource on a resource server, (vi) login URL or secure URL associated with a server resource, (vii) cookie information, (viii) token information (ix) API key information, (x) communication protocols supported by a server resource, (xi) protocol methods supported by a server resource, (xii) content type supported by a server resource, and (xiii) a data rate limit prescribed in connection with a server resource.

Configuration data may comprise one or more of (i) data port information or routing information corresponding a resource server, (ii) load balancing or routing policies, (iii) load balancing or routing techniques, (iv) management ports, (v) maximum number of processes or threads for each port, (vi) policies for generating logs, and (vii) server resource security settings corresponding to a resource server.

Session data may comprise one or more of (i) cookies, (ii) tokens, (iii) client ids and (iv) device ids.

Security data may comprise one or more of (i) cipher suites, (ii) digital certificates, (iii) session keys and (iv) asymmetric and symmetric ciphers received at an access control server.

In a system embodiment, responsive to the security server analysis of the server resource request message data indicating absence of indicators of compromise, said first security response comprises transmission of the server resource request message to a resource server.

The security server may be configured to (i) receive server resource response message data extracted from a server resource response message received from the resource server that received the transmitted server resource request message, and (ii) initiate a second security response, wherein (a) the initiated second security response is dependent on a result of analysis of the server resource response message data received at the security server, and (b) responsive to said analysis of the server resource response message data resulting in identification of an indicator of compromise by the security server, said second security response comprises non-transmission of at least one server response message from the resource server or non-transmission of at least one subsequently received server resource request message received from the originating terminal.

Responsive to the analysis of the server resource response message data resulting in identification of an indicator of compromise by the security server or that an originating terminal corresponding to the server resource request is identified within a blacklist, said second security response comprises one of (i) non-transmission of the server resource response message data by the access control server to a target terminal identified in the server resource response message data, or (ii) transmission of the server resource response message data by the access control server to a target terminal identified in the server resource response message data, and (i) non-transmission of at least one subsequent server resource response message received from said server resource for onward transmission to the same target terminal or (ii) or non-transmission of at least one subsequently received server resource request message received from the originating terminal.

Responsive to said security server analysis of the API response message data indicating absence of indicators of compromise, said second security response may comprise transmission of the server resource response message to the target client identified in said server resource response message.

The security server may be configured such that (i) analysis of the server resource request message data is preceded by identity authentication of the access control server from which the security server has received the server resource request message data, or (ii) analysis of the server resource response message data is preceded by identity authentication of the access control server from which the security server has received the server resource response message data.

The access control server may be communicably coupled to a security server cluster, and said access control server gateway may be configured such that any server resource request message data and its corresponding server resource response message data are both transmitted to a same security server within the security server cluster.

The present disclosure additionally provides computer program products for securing one or more resource servers. In various embodiments, the computer program product of the present disclosure comprises a non-transitory computer usable medium having a computer readable program code embodied therein, the computer readable program code comprising instructions for implementing one or more methods described in connection with the present disclosure.

BRIEF DESCRIPTION OF THE ACCOMPANYING DRAWINGS

FIG. 2 illustrates OSI protocol layers and corresponding TCP/IP protocol layers.

FIGS. 5A to 5D illustrate networking architectures comprising a scalable cluster of proxies and a security server cluster, according to embodiments.

FIGS. 8, 9, 10B, 11, and 12 illustrate methods of securing a server backend, according to embodiments.

Figure 10A:
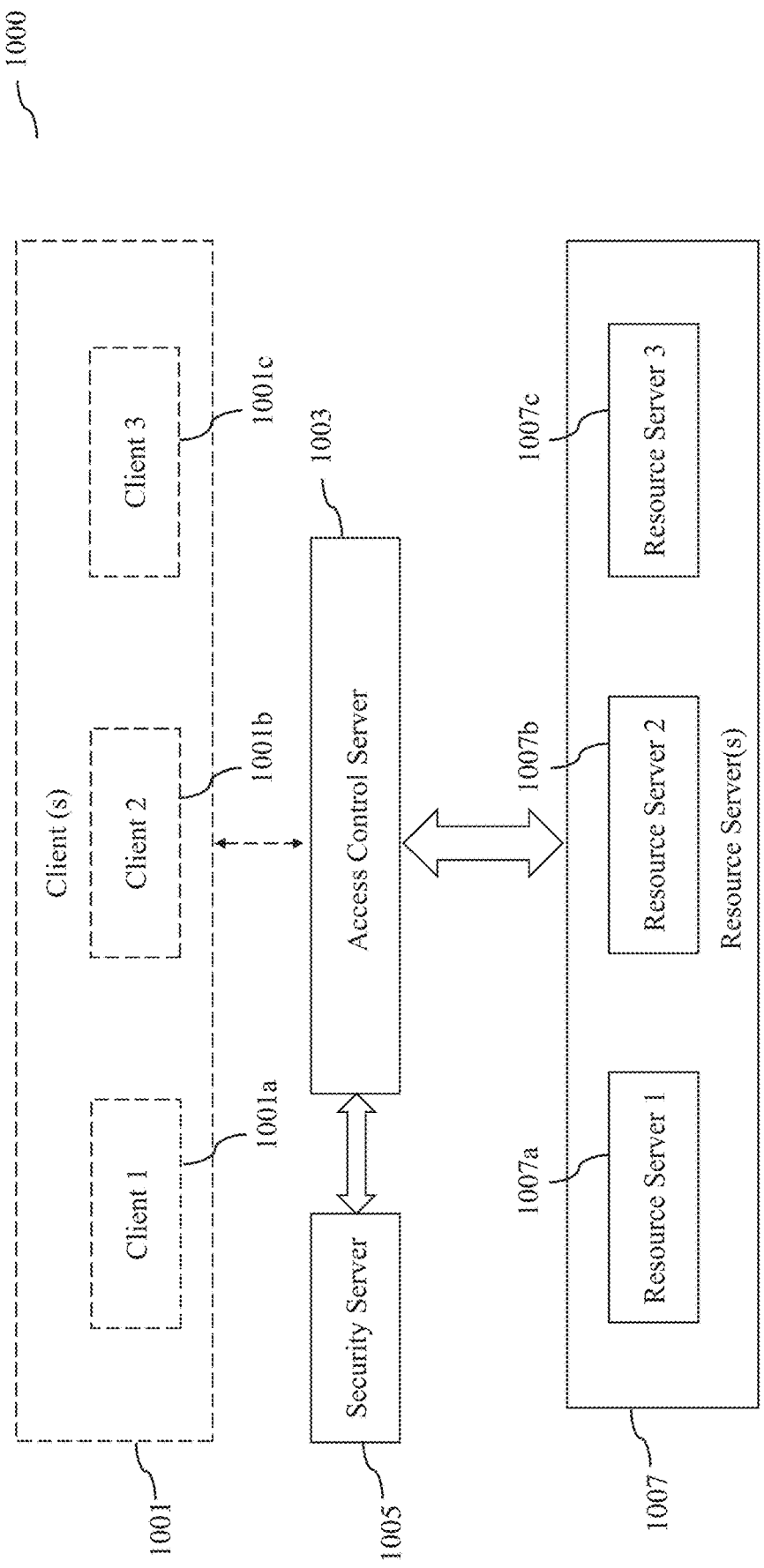
Figure 10B:
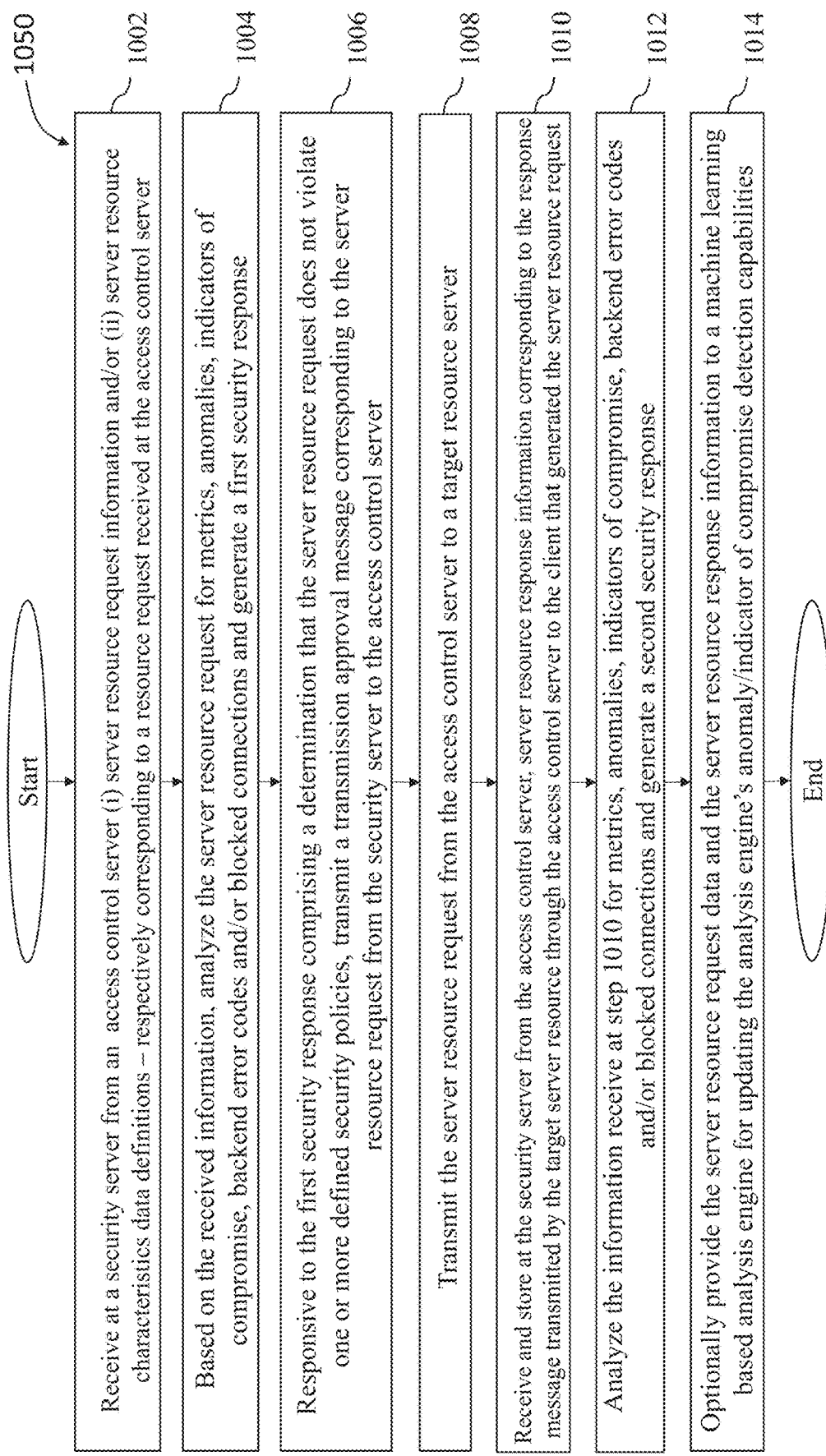

FIG. 10A illustrates a networking architecture that may be configured to implement the method of FIG. 10B, according to an embodiment.

Figure 13:
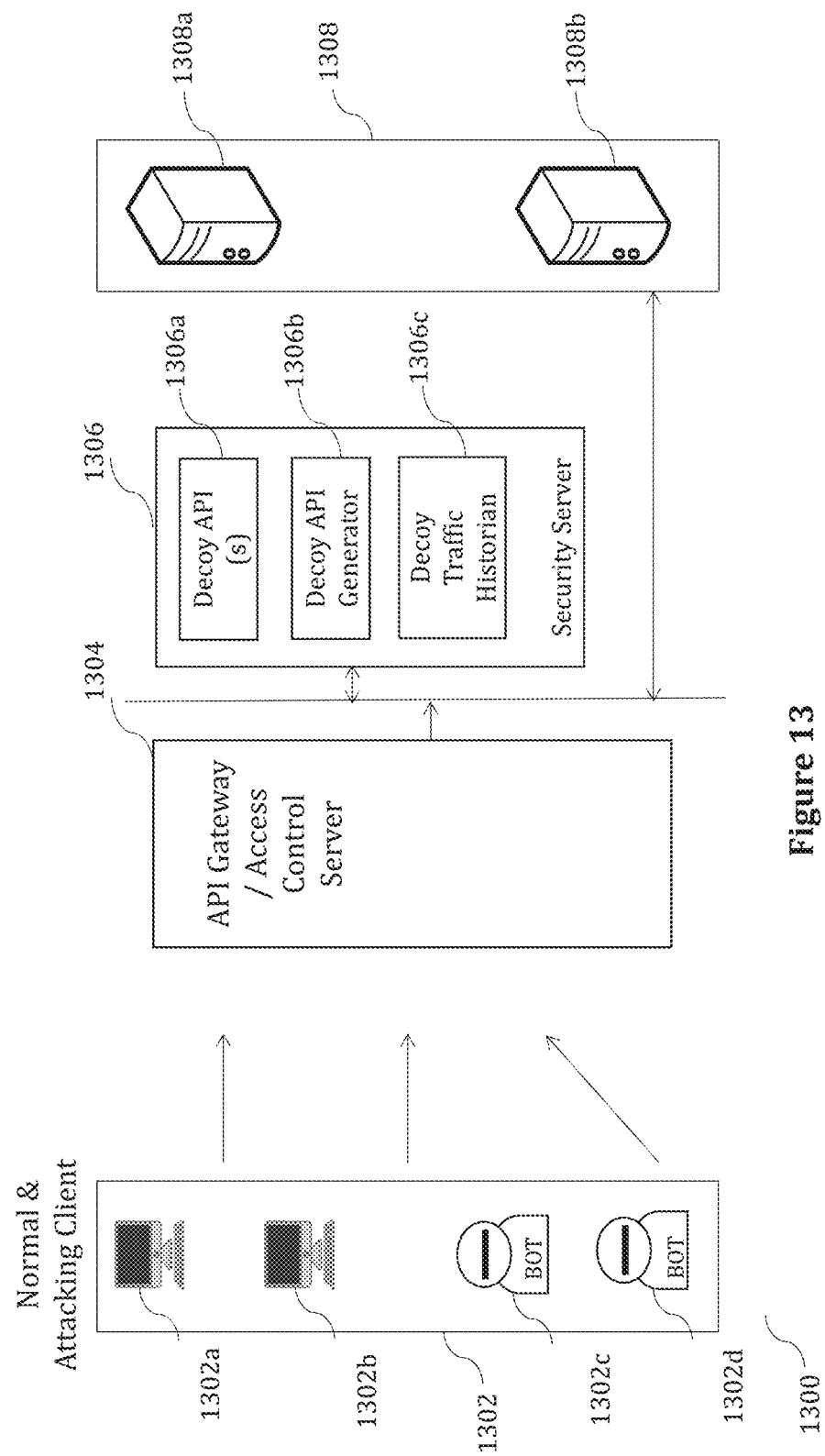

FIG. 13 illustrates a network server configured to implement decoy API based API security or application security, according to an embodiment.

Figure 14:
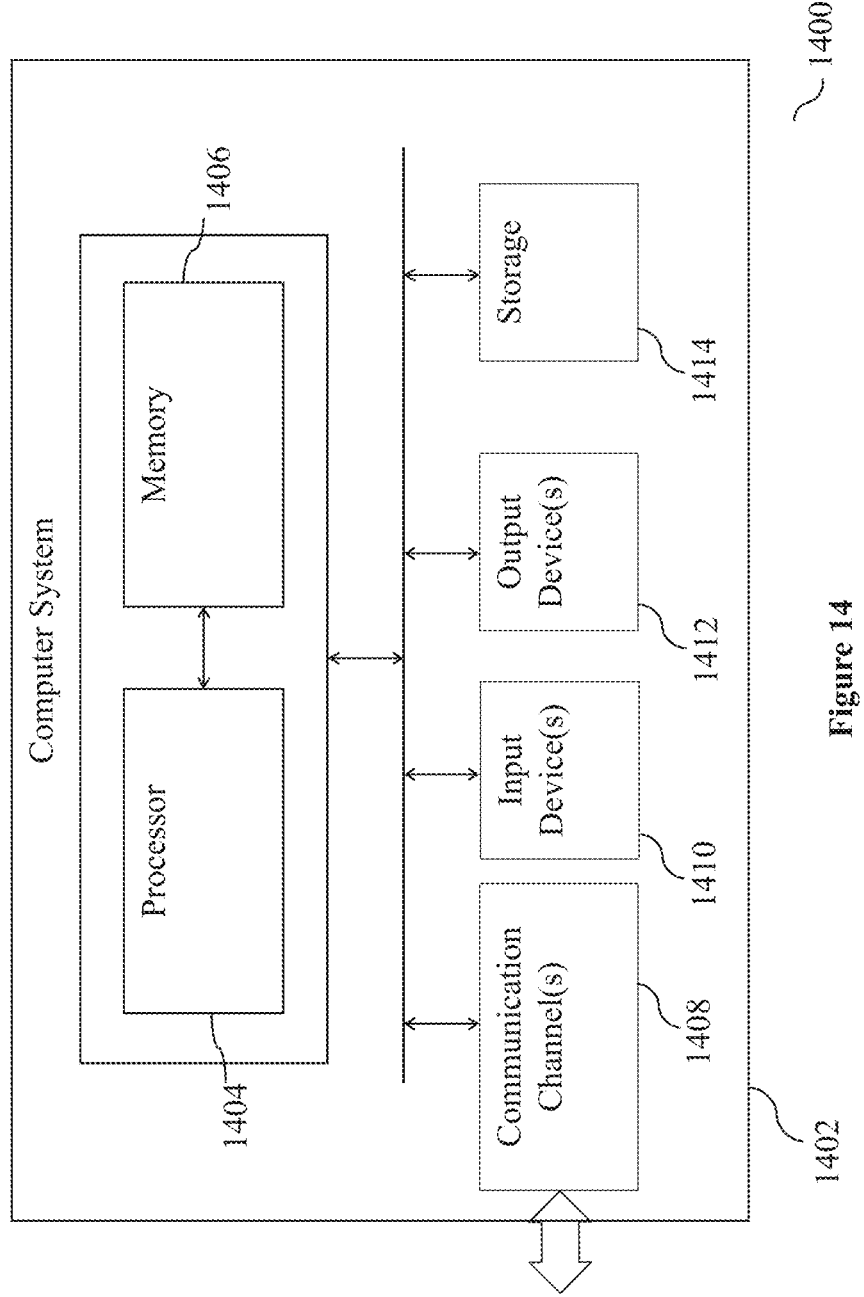

FIG. 14 illustrates an example system, according to an embodiment.

Figure 15:
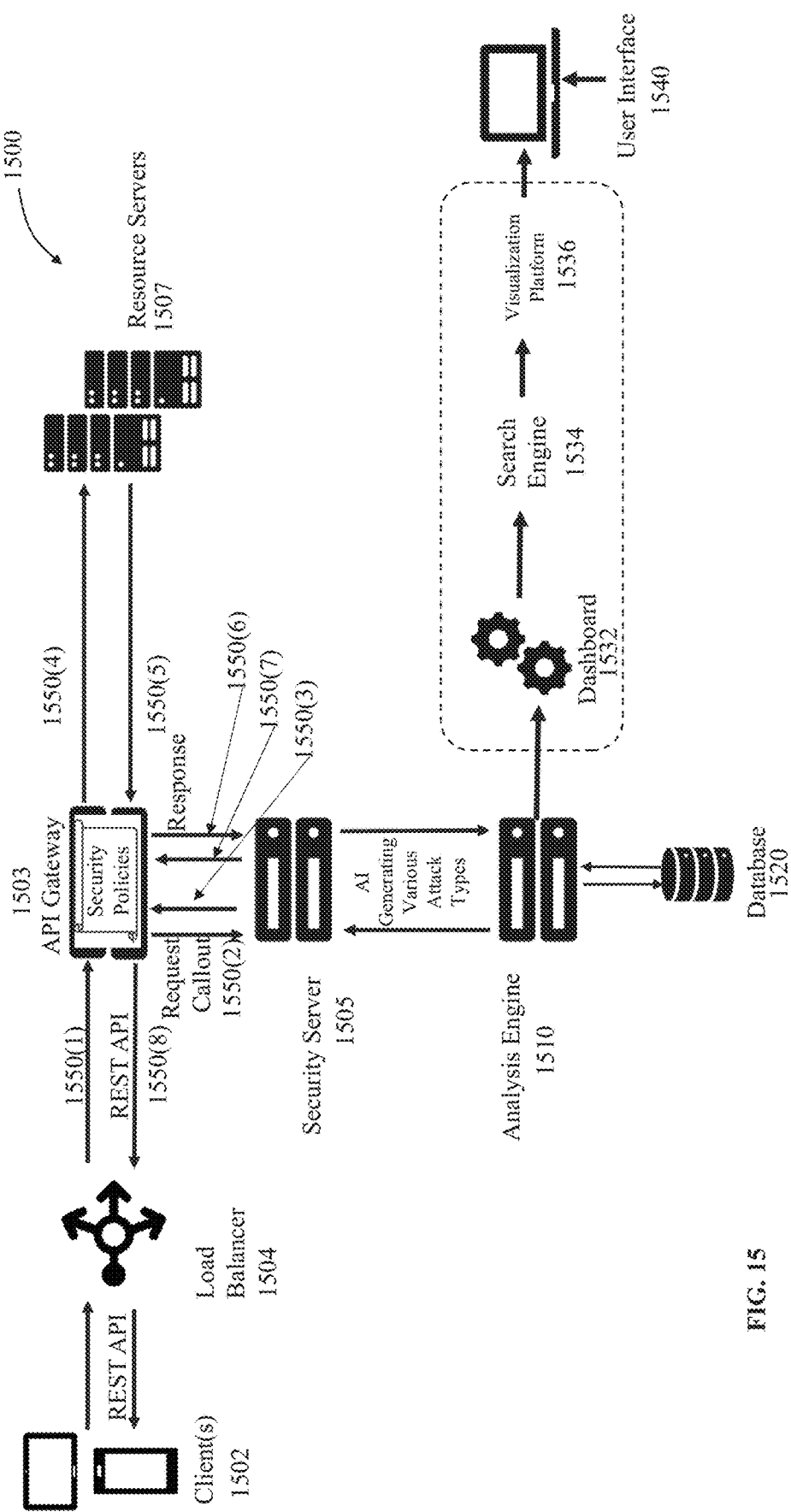

FIG. 15 shows a schematic of a system for securing a server backend using an API gateway, according to an embodiment.

Figure 16:
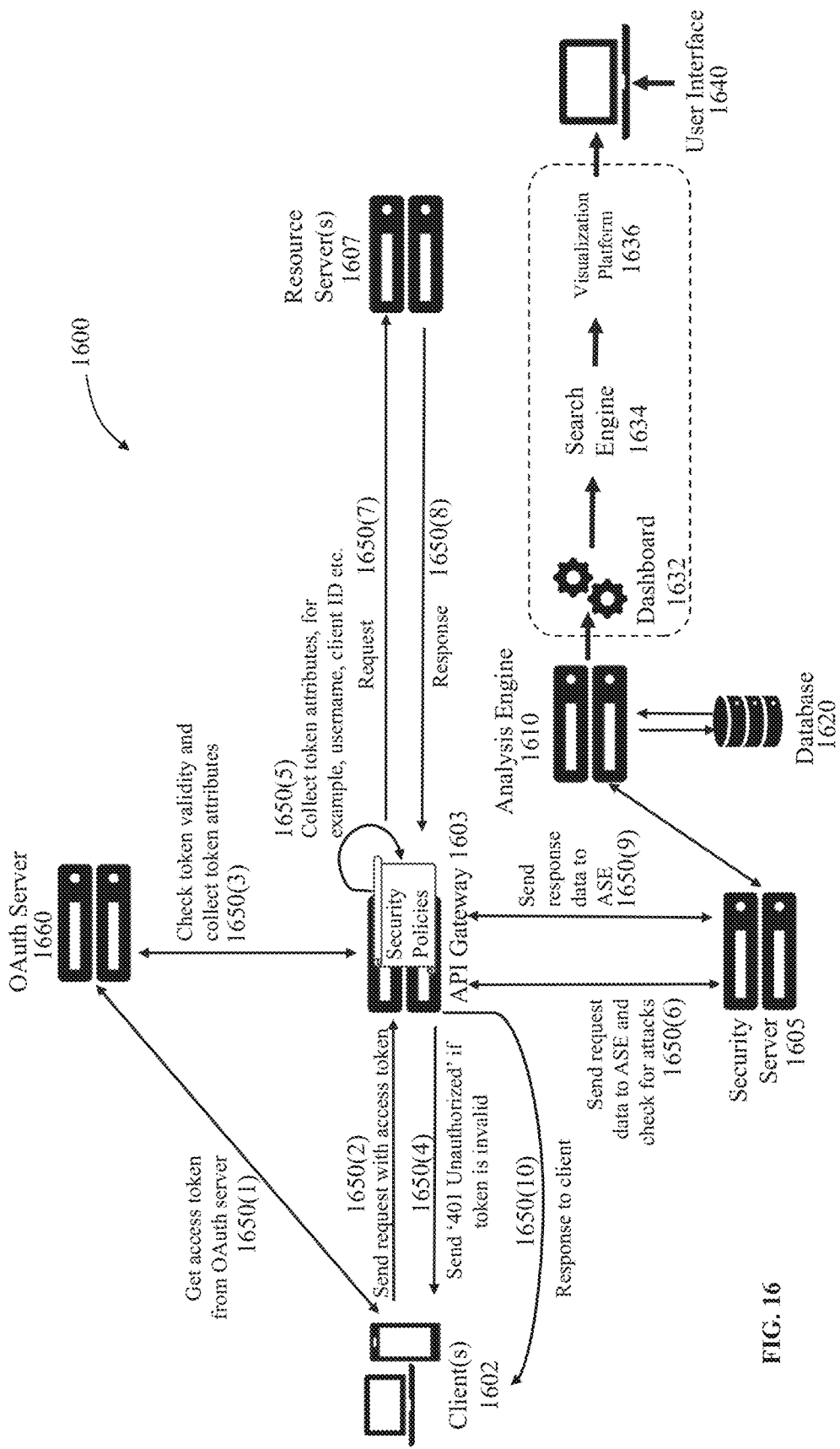

FIG. 16 shows a schematic of a system for securing a server backend based on token authentication, according to an embodiment.

DETAILED DESCRIPTION

The present disclosure relates to the domain of proxies configured for routing of client requests or messages between clients and servers. In some embodiments, systems, devices, and methods described herein provide for routing of client requests or messages between multiple different APIs (either running on a single server or distributed across multiple servers), as well as between multiple instances of an API (running on a single server or distributed across multiple servers).

In some embodiments, the present disclosure provides methods and systems for implementing API proxy based adaptive security. Such methods and systems implement said adaptive security to achieve improved backend API server security, while avoiding data bottlenecks and maintaining data throughput.

As described in further detail below, a first aspect of the present disclosure involves a method of API security that may be employed by proxies within a proxy cluster, for implementing routing decisions (for example routing or load balancing decisions) involving client requests or messages received at said proxies. Systems, devices, and methods described herein can achieve this by receiving, at a proxy within a proxy cluster, a client message designating a target API. The proxy extracts information from data packets corresponding to the client message and compares the extracted information against a predefined set of information or information types associated with the target API. In the event of a mismatch between the extracted information and the predefined set of information or information types associated with the target API, the client message may be designated as a threat and rejected.

A second aspect of the present disclosure involves generating or collecting, at one or more proxies within a proxy cluster, log information that captures a predefined set of data corresponding to client messages and requests received at the one or more proxies. The predefined set of data also contains information from responses from API servers. The predefined set of data includes data that can be used to correlate various communications between a client, a proxy, and a backend API server, and also includes data that can be used for generating API metrics and identifying anomalies and/or indicators of compromise.

In a third aspect, the present disclosure involves transmission of such predefined set(s) of data to a cluster of security servers, which analyze the received data to generate API metrics and/or identify anomalies or indicators of compromise. The anomalies or indicators of compromise may be transmitted back to proxies within the proxy cluster, and may be used by proxies within the proxy cluster to terminate existing connections and block subsequent requests or messages from clients associated with the identified anomalies or indicators of compromise. Anomalies and indicators of compromise may be identified based on machine learning algorithms or techniques. In implementation, one or more machine learning algorithms or techniques may involve creating graphs corresponding to each parameter, identifying a baseline of acceptable variations of variable values, and identifying deviations (indicative of indicators of compromise or anomalies) from such baselines.

Figure 1:
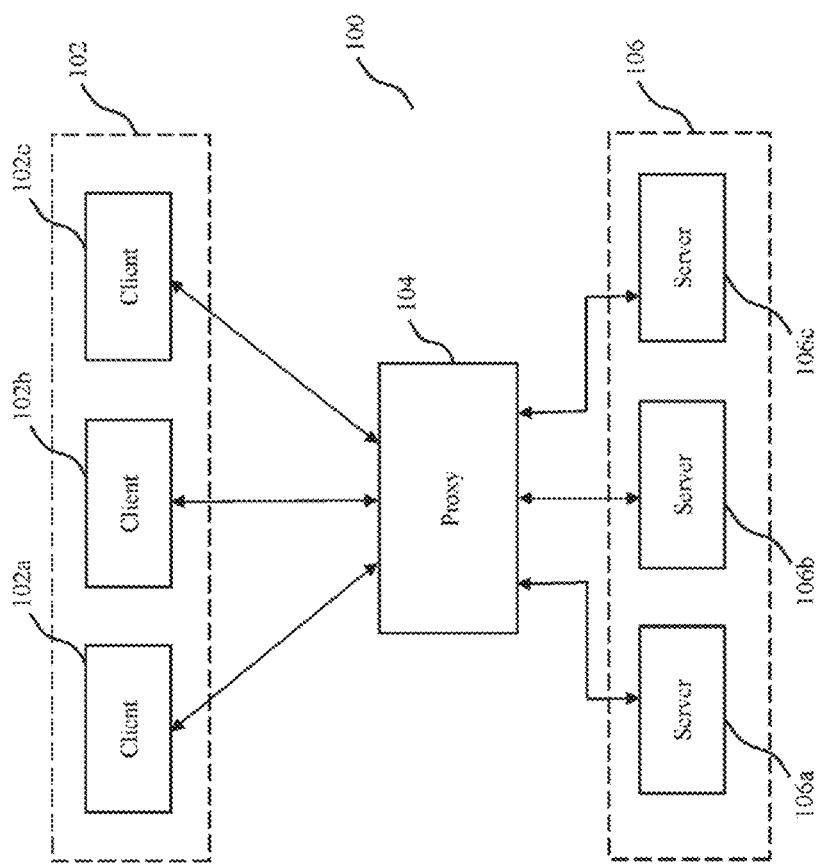
FIG. 1 illustrates a networking architecture comprising a proxy node positioned intermediate to clients and servers.

FIG. 1 illustrates a network architecture 100 comprising a proxy 104 disposed as a network intermediate between clients 102 (i.e. clients 102a, 102b and 102c) and servers 106 (106a, 106b and 106c).

Clients 102 (and other clients as described in the present disclosure) can be, for example, any device having information processing and network communication capabilities (e.g., including a processor and a memory). The types of clients may vary widely and include but are not limited to desktop computers, laptop computers or notebook computers, personal digital assistants, handheld computers, cellular phones, servers and Internet of Things (IOT) sensors or servers, gateways, brokers, or other such devices.

Proxy 104 (and other proxies or proxy nodes as described in the present disclosure) can be, for example, any device having information processing and network communication capabilities (e.g., including a processor and a memory) that is configured to route communications from a client to a server and/or vice versa. The types of proxies may vary widely and include but are not limited to routers, load balancers, full proxies, half proxies, security proxies, and IOT proxies. In some embodiments, a proxy or proxy node can comprise or be implemented as an API proxy or an API gateway positioned as a network intermediate device between clients and one or more backend API servers and configured to route incoming client request messages to target APIs and to route outgoing API response messages to target clients.

Based on information retrieved from a domain name system (DNS) server or other name server, requests or messages from client 102 for services from server backend 106 are directed to proxy 104. Proxy 104 transmits the received requests or messages to an appropriate server (106a to 106c) within server backend 106. Depending on the configuration of proxy 104, responses from servers 106a to 106c may first be received at proxy 104 and thereafter redirected to requesting client 102.

Servers 106a, 106b, 106c (and other servers as described in the present disclosure) can be, for example, any device having information processing and network communication capabilities (e.g., including a processor and a memory), and which is configured to provide one or more services to a requesting client, over a communication network. The types of servers may vary widely, and include but are not limited to API servers, application servers, microservices, web servers, FTP servers, IOT brokers or gateways, message brokers, or service oriented architecture (SOA) servers. Server backend 106 (and other server backends as described in the present disclosure) can refer to a set of one or more servers.

In implementing proxy functionality (for example, routing or load balancing), a proxy receives data packets addressed to a target service or server. The proxy transmits the data packets to an appropriate server based on predefined policies and techniques (e.g. routing or load balancing policies and techniques). Such switching decisions typically rely on information associated with Layers 2 to 4 of the Open System Interconnection ("OSI") model, or Transmission Control Protocol/Internet Protocol ("TCP/IP").

Other suitable examples of proxy nodes and their use in various contexts are provided in U.S. Patent Application Publication No. 2017/0012941, titled "Methods and Systems for API Proxy Based Adaptive Security," published Jan. 12, 2017, incorporated herein by reference in its entirety.

FIG. 2 illustrates protocol layers of the OSI model 200 and the corresponding TCP/IP model. In the OSI model, each network device modularly implements the various OSI layers. Beginning with Layer 7 and progressing downward, each layer communicates with the layer immediately below and immediately above. As devices move to lower layers, the information is increasingly packaged for the specific hardware associated with the device/network—concluding in Layer 1, which is the physical communication channel. Under TCP/IP, Layers 1 to 2 are implemented as a subnet (or Media Access Control (MAC)) stack, Layer 3 as the Internet (or Internet Protocol (IP)) stack, Layer 4 as the transport (or Transmission Control Protocol/User Datagram Protocol (TCP/UDP)) stack, and Layers 5 to 7 as the Application stack. Data generated by a first network device is processed down the protocol stacks, from Layer 7 to Layer 1, into a packet, with each stack adding a header to the packet. The packet is then transmitted over a physical channel to a second network device, which processes the packet up the stacks starting from Layer 1, and unwraps the respective headers after terminating them at their associated stacks. At Layer 7, the application data of the first device is retrieved for interaction with the application of the second device.

Figure 3:
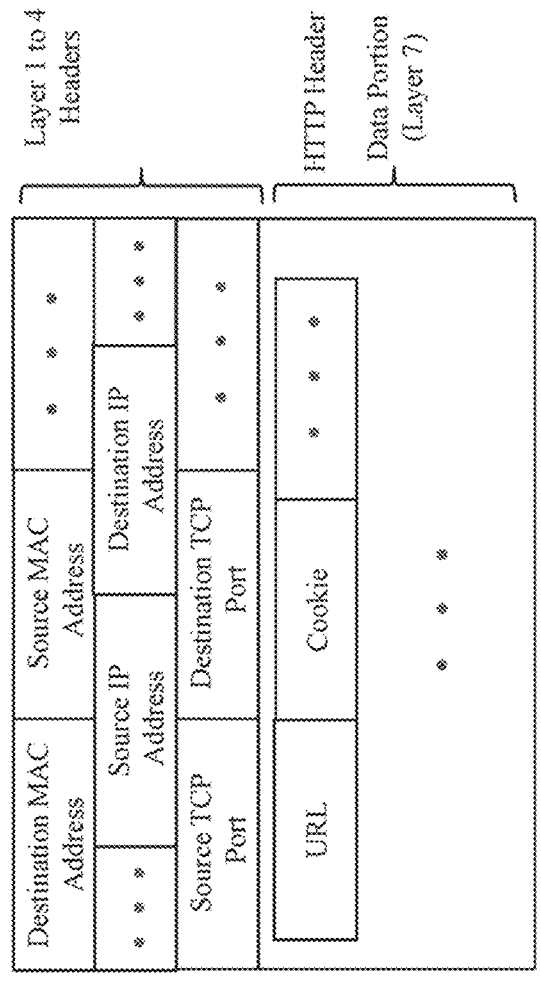
FIG. 3 illustrates headers of an IP packet.

FIG. 3 illustrates various headers of an IP packet 300. Each IP packet includes a data portion for carrying a data payload and a header portion for carrying overhead information. The header portion is partitioned into layer or protocol dependent headers. By way of example, a Layer 2 or MAC header includes a destination MAC address and a source MAC address that specify the destination and source hardware addresses, respectively, of a node within a subnet. A Layer 3 or IP header includes a source IP address and a destination IP address that specify the IP addresses of the source and destination nodes, respectively, on the Internet. A Layer 4 or TCP header includes a source TCP port and a destination TCP port that specify the port numbers used by the source node and the destination node, respectively.

The payload/data portion of the IP packet contains Layer 7 information which includes data generated by the application. This data may include HTTP headers, which are regarded as application data and are therefore located in the payload portion of the IP packet. The HTTP header may comprise a URL field for specifying a URL that the data packet is requesting, and may also include a cookie field for the application to communicate environmental information.

Figure 4:
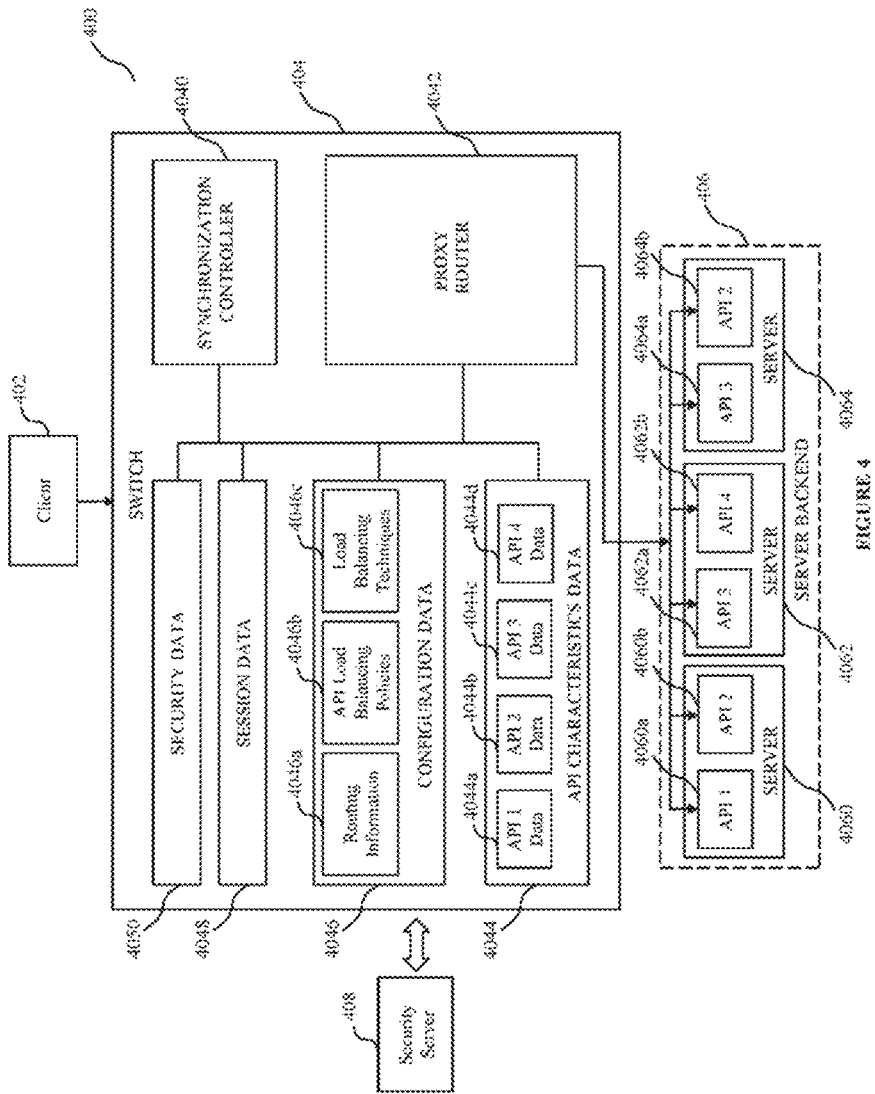
FIG. 4 illustrates a networking architecture comprising a proxy incorporating API based routing and a security server, according to an embodiment.

FIG. 4 illustrates a network architecture 400 having proxy 404 disposed as a network intermediate between client(s) 402 and server backend 406. Server backend 406 comprises servers 4060, 4062, and 4064. Server 4060 is illustrated as running instances of two APIs, i.e., API 1 (4060a) and API 2 (4060b). Server 4062 is illustrated as running instances of two APIs, i.e., API 3 (4062a) and API 4 (4062b). Server 4064 is illustrated as running instances of two APIs, i.e., API 3 (4064a) and API 2 (4062b). In some embodiments, server 4062 and server 4064 are each running a separate instance of API 3 (i.e. 4062a and 4064a) and that server 4060 and server 4064 are each running a separate instance of API 2 (i.e. 4060b and 4064b). Servers 4060, 4062, and 4064 are examples of API servers, e.g., servers running at least one instance of at least one API. The distribution of two APIs per server is only illustrative and is not intended to be limiting and that the number of servers within the server backend is also only illustrative and not limiting.

Proxy 404 is configured for API based routing functions (for example, routing or load balancing functions) among API servers. Proxy 404 comprises a proxy router 4042 and a synchronization controller 4040. Proxy 404 may additionally include or enable access to one or more repositories of data associated with proxy 404, and the repositories of data can include, for example: (i) API characteristics data 4044, (ii) configuration data 4046, (iii) session data 4048, and (iv) security data 4050. One or more repositories comprising the above data may in various embodiments described herein be accessible by one or both of proxy router 4042 and synchronization controller 4040.

API characteristics data 4044 comprises information identifying one or more characteristics of each API implemented within the server back end 406. In an embodiment illustrated in FIG. 4, API characteristics data 4044 includes a unique set of API characteristics data definitions (API 1 data (4044a), API 2 data (4044b), API 3 data (4044c) and API 4 data (4044d)) corresponding to each distinct API (i.e. to API 1 (4060a), API 2 (4060b, 4064b), API 3 (4062a, 4064a) and API 4 (4062b)) implemented within the server backend 406. In the illustration of FIG. 4, server backend 406 implements 4 distinct APIs, i.e., API 1 (4060a), API 2 (4060b and 4064b), API 3 (4062a and 4064a), and API 4 (4062b). Each of APIs 1 to 4 accordingly has a corresponding unique API characteristics data definition within API characteristics data 4044, i.e., (i) API 1 has corresponding API characteristics data definition 4044a, (ii) API 2 has corresponding API characteristics data definition 4044b, (iii) API 3 has corresponding API characteristics data definition 4044c, and (iv) API 4 has corresponding API characteristics data definition 4044d.

Example, non-limiting API characteristics defined within each API characteristics data definition may include one or more of: (i) client side name associated with the API (i.e. external API name), (ii) server side name associated with the API (i.e. internal API name), (iii) hostname associated with the API, (iv) IP address of API server, (v) TCP port associated with the API on said API server, (vi) login URL or secure URL associated with the API, (vii) cookie information, (viii) communication protocols supported by the API (e.g. HTTP, WebSocket, MQTT, CoAP, etc.), (ix) HTTP methods or other protocol methods supported by the API (e.g. GET, POST, PUT, DELETE for HTTP, Streaming for WebSocket, Publish/Subscribe for MQTT etc.), and (x) content type supported by the API.

In an embodiment where multiple instances of an API are being implemented across multiple servers, or within a single server, an API characteristics data definition corresponding to such API may include the IP address of each API server that is being used to implement each instance of the API, as well as the TCP port associated with each instance of the API.

In some embodiments, each API characteristics data definition may associate (and internally map) two API names with each API. One of the API names is an external API name, which is made available to clients and/or client applications, i.e. the API name by which the API is referred to in client requests or messages. The other API name is an internal API name, which is the server side name for the API, i.e. the API name associated with the API at the server backend 406, and used by the proxy when communicating with the API at the server backend 406. The internal API name is not exposed to clients. In operation, an external API name is identified at a proxy, based on information extracted from a client request or message. This external API name may be matched with external API names within various API characteristics data definitions, until a matching API characteristics data definition is found (i.e. until an API characteristics data definition having an external API name that matches the external API name extracted from the client request or message is found). The internal API name corresponding to the matching API characteristics data definition may thereafter be used to transmit the client request or message onward to the target API.

The internal-external API naming configuration presents security related advantages, which are discussed in further detail hereinafter. Additionally, this internal-external API naming configuration ensures that a backend API can be replaced or substituted with a new API at any point of time (e.g., by simply changing the internal-external API name mapping within the API characteristics data definition), without having to inform or update client devices regarding the replaced or substituted API.

In an embodiment, each API characteristics data definition may comprise a data file uniquely associated with an API, or a set of data records uniquely associated with an API.

Example, non-limiting instances of configuration data 4046 comprise configuration information that proxy 404 requires to effect routing of incoming client requests or messages to an API server within the server backend 406. In an embodiment, configuration data 4046 may comprise one or more of (i) data port information and/or other routing information 4046a corresponding to one or more servers within a server backend, (ii) load balancing or routing policies 4046b, (iii) load balancing and/or routing techniques 4046c, (iv) management ports, (v) maximum number of processes or threads for each port, (vi) policies for generating logs (i.e. policies regarding what events or information to log, event triggers for logging and log persistence and/or management policies), and (vii) API security settings corresponding to one or more API servers within the server backend.

Example, non-limiting instances of session data 4048 comprise information identifying one or more characteristics of users or clients communicating through proxy 404. In an embodiment, session data 4048 comprises one or more of (i) cookies, (ii) tokens, (iii) client IDs, and (iv) device IDs. In some embodiments, session data 4048 may be limited to information that is active (i.e. that has not expired) in accordance with session expiry policies of one or more API servers within the server backend 406.

Example, non-limiting instances of security data 4050 comprise Transport Layer Security/Secure Sockets Layer (TLS/SSL) security data corresponding to each session that is active (i.e. that has not expired) in accordance with applicable session expiry policies. In an embodiment, security data 4050 may comprise one or more of cipher suites, digital certificates (including one or more of server name, a trusted certificate authority (CA) and a backend server's public encryption key), session keys and/or asymmetric, and symmetric ciphers that have been received at proxy 404.

In addition to the above, while not illustrated in FIG. 4, proxy 404 may additionally include information identifying all other live or active proxy nodes (i.e., proxy nodes other than proxy 404) within a cluster of proxies. In an embodiment, this information may include one or more of hardware identification information, IP address information, and/or network routing information corresponding to such other live or active proxy nodes within the cluster of proxies.

Proxy 404 may also include a data packet parser (not shown in FIG. 4) configured to parse at least API data from data packets corresponding to a received client request or message.

Proxy 404 includes proxy router 4042, which may be configured to (i) receive client requests or client messages, and (ii) respond to received requests or messages satisfying one or more predefined criteria, by transmitting said requests or messages onward to an appropriate API within one or more API server(s) within the server backend. Proxy controller 4040 is a controller configured to implement routing or load balancing of client requests or messages received at a proxy node so as to, e.g., ensure that legitimate client requests or messages are transmitted onwards to an API server configured to implement an API identified in the client request or message.

In some embodiments, the network architecture 400 comprises a cluster of switches, and the proxy 404 can additionally comprise a processor based synchronization controller 4040 that is configured to respond to a predefined synchronization event or synchronization trigger by synchronizing one or more of (i) a data state of one or more of API characteristics data 4044, configuration data 4046, session data 4048, security data 4050, and information identifying other live or active proxy nodes, with (ii) a data state of corresponding API characteristics data, configuration data, session data, security data, and/or information identifying other live or active proxy nodes, associated with another proxy node within the proxy cluster. In an embodiment, synchronization controller 4040 is configured to synchronize data states of more than one (and sometimes all) of (i) API characteristics data 4044, configuration data 4046, session data 4048, security data 4050, and information identifying other live or active proxy nodes, with (ii) data states of corresponding API characteristics data, configuration data, session data, security data, and information identifying other live or active proxy nodes within the switch cluster. It would be understood that in an embodiment, synchronization of data states may involve synchronization of state changes that have occurred since a previous synchronization event.

In an embodiment, proxy 404 may be configured so as to implement (i) a control plane comprising a processor implemented control process, and (ii) one or more data planes, each of which comprises a balancer process implemented by a discrete processor.

The control plane or control process may be configured for one or more of:

Receiving a new API characteristics data definition corresponding to each new API for which proxy 404 is configured to route client requests or messages. In an embodiment, each new API characteristics data definition may be received through a command line interpreter (CLI) or a RESTful API (REST API).

Validating each received new API characteristics data definition based on a prescribed API characteristics data definition schema and/or one or more validation rules.

Persisting validated API characteristics data definitions in a repository associated with or accessible by a proxy.

Synchronizing repositories associated or accessible by each proxy in a proxy cluster so that all proxies within the proxy cluster have access to validated and persisted API characteristics data definitions.

Monitoring cookies and other session data at each proxy within the proxy cluster and synchronizing all proxies within the cluster to share cookie data and other session data.

Monitoring health of each data plane and raising alerts in case a balancer process associated with a data plane crashes or is rendered inoperative.

Each data plane or balancer process may be configured for one or more of:

Comparing data parsed from data packets associated with a client request or message, with data in API characteristics data definitions, and identifying an API characteristics data definition corresponding to a target API.

Implementing routing or load balancing decisions based on contents of an identified API characteristics data definition that corresponds to a target API.

Implementing authentication steps involving comparison between (i) request or message parameter information (for example information extracted at step 704 in the method 700 described with reference to FIG. 7) against (ii) corresponding parameter information specified within the matching API characteristics data definition (for example as identified at step 706 in the method 700 described with reference to FIG. 7) and rejecting client requests or messages that fail one or more authentication steps.

Implementing two-stage rate limiting protection for API servers, where the protection includes front end rate limiting protection and back end rate limiting protection. The front end rate limiting protection includes blocking client messages or requests associated with an IP address that has exceeded a predefined threshold for API accesses per unit time. The back end rate limiting protection includes proxy node based limiting of delivery of client messages to an API, API server, or API server cluster that has exceeded a predefined number of client messages or requests that said API, AI server or API server cluster can process simultaneously. The front end rate limiting may in an embodiment be implemented on an individual proxy node basis, based on information regarding the number of client messages received at the individual proxy node from a specific IP address. The back end rate limiting may in an embodiment be implemented based on a proxy-cluster wide basis, based on information aggregated (e.g., through synchronization of proxy nodes) from all nodes regarding the total number of client messages or requests being processed by an API, API server, or API server cluster.

Checking cookies and other session data, and implementing load balancing decisions based on such cookies and/or session data.

By implementing separate and independent processes for the control plane and the one or more data planes, systems, devices, and methods described herein improve high availability as well as scalability. Additionally, the separation of control and data planes improves security of the system, by enabling the control plane to continue to operate in isolation despite security attacks on one or more data planes.

Additionally in some embodiments, proxy 404 may be configured to implement asynchronous message based inter process communication (IPC) between the control plane and each data plane. As a consequence of the plurality of data planes, this enables proxy 404 to operate asynchronously, i.e., while a proxy waits for a response from any target API or API server hosting a target API, the proxy can move on to execution of a next process or can communicate with another target API or with an API server hosting another target API.

In an embodiment, proxy 404 (or each proxy within a proxy cluster) may be configured to initialize a new data plane (i.e. a new balancer process) for each additional protocol (e.g. HTTP, HTTPS, Web Socket, MQTT or CoAP) or TCP port supported by the proxy. The proxy 404 (or each proxy within a proxy cluster) may further be configured to initialize a plurality of sub-processes associated with each data plane. The plurality of sub-processes enables a proxy to receive and simultaneously handle a larger number of client requests or messages, and improves utilization of underlying device resources (e.g. processor capacity, I/O and memory), thereby improving high availability as well as scalability.

In an embodiment, proxy 404 may additionally be provisioned with a REST API configured to allow queuing of requests to a particular API server, until the API server becomes available. Requests for a particular API server may be queued at proxy 404 and forwarded to the API server when its availability is confirmed (for example by pinging the server until a response is received from the server). Such queuing at proxy 404 further enables asynchronous communication between the proxy and clients.

FIG. 5A illustrates a network architecture 500, wherein a proxy cluster 504 is disposed as a network intermediate between clients 502 (i.e. clients 502a, 502b and 502c) and an API server backend 506 (i.e. API server 5060 (comprising API 1 and API 2); API server 5062 (comprising API 3 and API 4); and API servers 5064 (comprising API 3 and API 2)). Each client request or client message directed towards server backend 506, and each response from server backend 506, is routed through proxy cluster 504.

As illustrated in FIG. 5A, proxy cluster 504 comprises a plurality of proxy nodes (e.g., proxies 504a, 504b and 504c). Proxies 504a, 504b and 504c within proxy cluster 504 can be interconnected via an overlay network. A client request or message for an API implemented on an API server within server backend 506 is routed to a proxy within proxy cluster 504. Based on API characteristics data available to the specific proxy, the proxy may route the client request to an appropriate API implemented at an API server within server backend 506. Responses from an API server to the client request or message are likewise transmitted from the API server back to the specific proxy, and onward from the specific proxy to the client from which the request or message originated.

In some embodiments, the decision to route a client request or message to a specific proxy within proxy cluster 504 can be based on routing logic or routing policies within a DNS server or other name server (not shown in FIG. 5A). Example load balancing parameters that the routing policies of the DNS server may rely on for selecting a specific proxy within proxy cluster 504 may include one or more of: location of the requesting client, location of the target API server(s), present load balance among proxies within the proxy clusters, content and/or type of request etc.

Selection of a target API and target API server (within server backend 506) by a proxy within proxy cluster 504 may be determined in accordance with the method discussed in more detail subsequently in connection with FIG. 7. In an embodiment, a plurality of proxies within proxy cluster 504 (and in some instances all proxies within proxy cluster 504) may be configured to use identical methods for selecting a target API server, thereby ensuring that a specific client request or message can undergo identical routing/onward transmission by a proxy within proxy cluster 504, regardless of which proxy (within the proxy cluster) the client request or message is received at.

Figure 6:
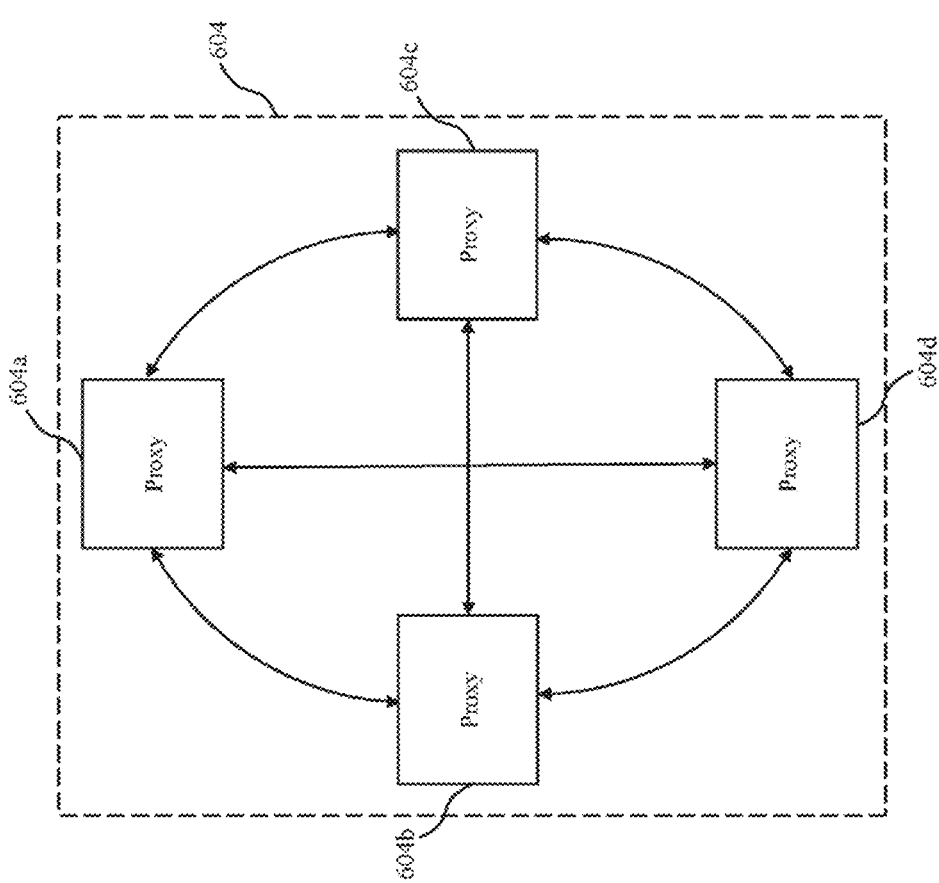
FIG. 6 illustrates a peer-to-peer network configuration of a cluster of proxies, according to an embodiment.

FIG. 6 illustrates an embodiment where proxy cluster 604 comprises four proxies 600a to 600d. It would be understood that the selection of a proxy cluster comprising four proxies is provided as an example, and that proxy cluster 604 may comprise any number of proxies, including numbers less than four and greater than four. Each proxy 604a to 604d within proxy cluster 604 may comprise an instance of proxy 404 discussed previously in connection with FIG. 4. Accordingly, the synchronization process between proxies 604a to 604d may result in all proxies within proxy cluster 604 having identical data states corresponding to one or more (and in some instances all) of API characteristics data 4044, configuration data 4046, session data 4048, security data 4050, and information identifying other live or active proxy nodes within the cluster. As illustrated in FIG. 6, the synchronization of data states between proxy nodes results in a peer-to-peer synchronization configuration within proxy cluster 604, wherein each proxy 604a to 604d is a peer node within the peer-to-peer synchronization configuration.

In an embodiment, each proxy within a proxy cluster (e.g., cluster 604) periodically carries out a heartbeat messaging procedure (i.e. a ping-pong message/response procedure) with all other switches and updates its list of active peer nodes (i.e. the information identifying other live or active proxy nodes) depending on whether the heartbeat messaging procedure returns an error.

Figure 7:
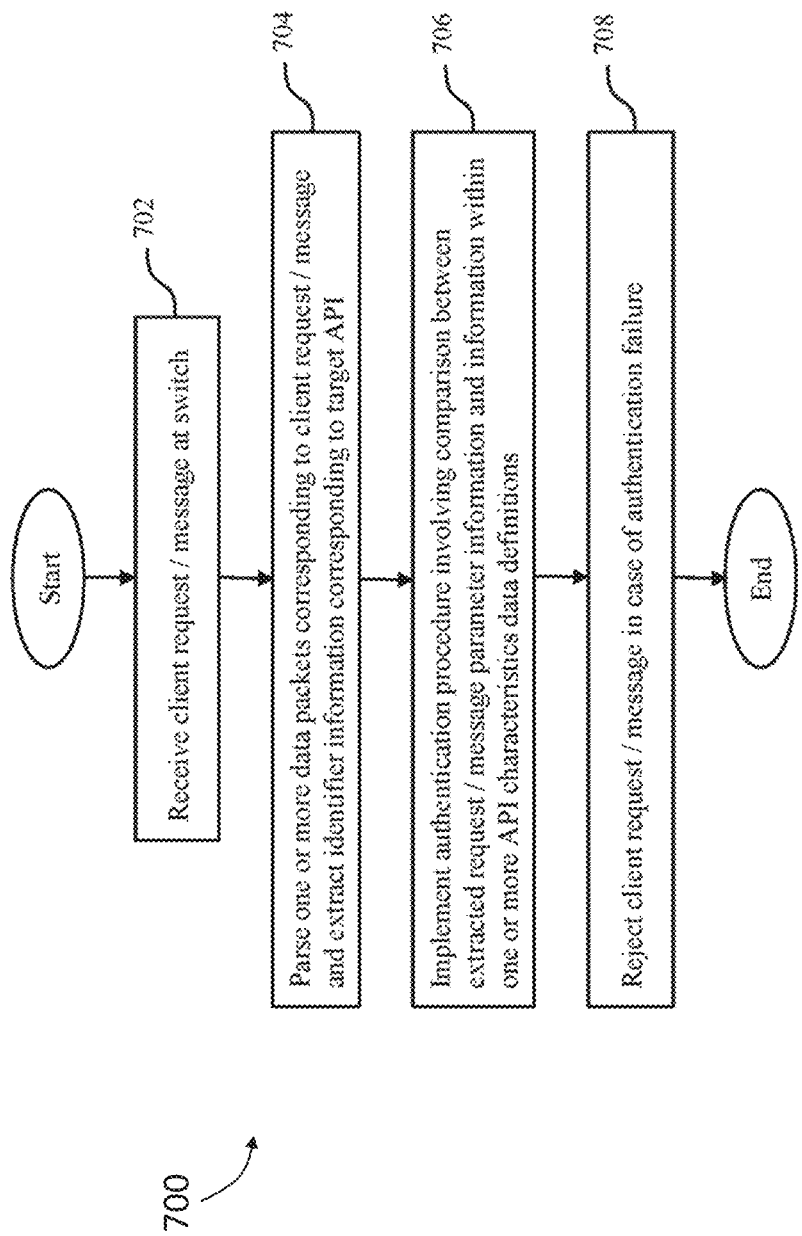
FIG. 7 illustrates a method of API security employed by a proxy, according to an embodiment.

FIG. 7 illustrates a method 700 of API security authentication that may be employed by proxies of the present disclosure, in implementing switching decisions (for example routing or load balancing decisions) involving client requests or messages received at said proxies.

Step 702 comprises receiving a client request or message at a proxy (for example proxy 404). Step 704 thereafter comprises parsing one or more data packets corresponding to the received client request or message, and extracting request or message parameter information. In an embodiment, parsing of the data packets may be implemented by a data packet parser within the proxy. The request or message parameter information extracted from parsed data packets may in an embodiment comprise parameter information extracted from API data within the received data packets.

In an embodiment, the parameter information extracted at step 704 may comprise at least one of a target API name and a hostname associated with the target API. The parser may optionally extract one or more of cookie information, communication protocols used or identified, HTTP methods or other protocol methods used or identified, and content type used or identified in the request/message.

Step 706 comprises implementing an authentication procedure involving a comparison between extracted request or message parameter information (from step 704) and information within one or more API characteristics data definitions. The authentication procedure may be implemented based on one or more predefined set of authentication rules. In case the authentication procedure results in an authentication failure, step 708 comprises rejecting or discarding the client request or message (i.e. without transmitting said request or message onward to the server backend) optionally with an error message returned to the client. On the other hand if the client request or message is successfully authenticated, the request or message may be transmitted onward to a target API at the server backend.

In an embodiment of step 706, the authentication procedure comprises one or more of:

API name enforcement: matching an external API name extracted from the client request or message (for example a HTTP, Web Socket, MQTT or CoAP protocol based request or message) against external API names corresponding to each available API characteristics data definition available within or associated with a proxy; a failure to identify an API characteristics data definition having a matching external API name forms an event of authentication failure. It would be understood that in an embodiment, the external API name and internal API name may be identical.

Protocol enforcement: subsequent to identification of an API characteristics data definition having a matching API name, matching a communication protocol (for example, a HTTP, Web Socket, MQTT or CoAP protocol) identified from data packets corresponding to the client request or message with one or more permitted communication protocols identified or listed in the identified API characteristics data definition; a non-match event between a communication protocol identified from the client request or message and the one or more communication protocols identified or listed in the API characteristics data definition forms an event of authentication failure.

Method enforcement: subsequent to identification of an API characteristics data definition having a matching API name, matching a protocol method (for example, a HTTP, Web Socket, MQTT or CoAP protocol methods) identified from data packets corresponding to the client request or message with one or more permitted protocol methods identified or listed in the API characteristics data definition; a non-match event between a protocol method identified from the client request or message and the one or more permitted protocol methods identified or listed in the identified API characteristics data definition forms an event of authentication failure.

Content type enforcement: subsequent to identification of an API characteristics data definition having a matching API name, matching a requested content type (for example, content requested within a HTTP, Web Socket, MQTT or CoAP protocol based request) identified from data packets corresponding to the client request or message with one or more permitted content types identified or listed in the identified API characteristics data definition; a non-match event between a requested content type identified from the client request or message and the one or more permitted content types identified or listed in the identified API characteristics data definition forms an event of authentication failure.

By implementing API security based on one or more of API name enforcement, protocol enforcement, method enforcement, and content type enforcement, a proxy node may be configured to discard or reject client requests or messages that do not comply with one or more predefined authentication requirements. By rejecting such requests or messages before they reach the server backend, the proxy node improves the security configuration of the server backend and of APIs within the server backend. In addition to the authentication methods described above, a proxy node may optionally rely on cookie information within a client request or message and/or a specified data rate limit in arriving at a decision regarding authentication and onward transmission of the request or message to an API at the server backend.

In addition to the above methods of authentication implemented by proxy nodes within proxy cluster, one or more proxy nodes may additionally be configured to sanitize error messages received from API servers in response to a client message. Error messages received from servers, if communicated directly to a client, can provide the client with significant amounts of information that can be misused by a user or client to bypass API security mechanisms or to circumvent server security mechanisms. The present disclosure addresses this problem by including, within API characteristics data definitions corresponding to one or more (and in some instances each) API, information (e.g. rules or mapping information) that enables a proxy to respond to receipt of error information from an API or API server implementing an instance of said API by either (i) modifying the error information received from the API or API server (for example by reducing the amount of error information or by redacting certain error information) prior to onward transmission of an error message to a client or (ii) replacing the error information received from the API or API server with a predefined or templatized error message for onward transmission to a client. The modification or replacement of error information from each API may be based on rules or mapping information provided within the API characteristics data definition corresponding to said API.

Referring back to FIG. 4, in the illustrated embodiment, proxy 404 is in network communication with security server 408 configured to receive API data from proxy 404 and to enable implementation of API security with respect to server backend 406. In an embodiment, security server 408 may be configured to implement the method of securing a server backend shown in FIG. 8.

Figure 8:
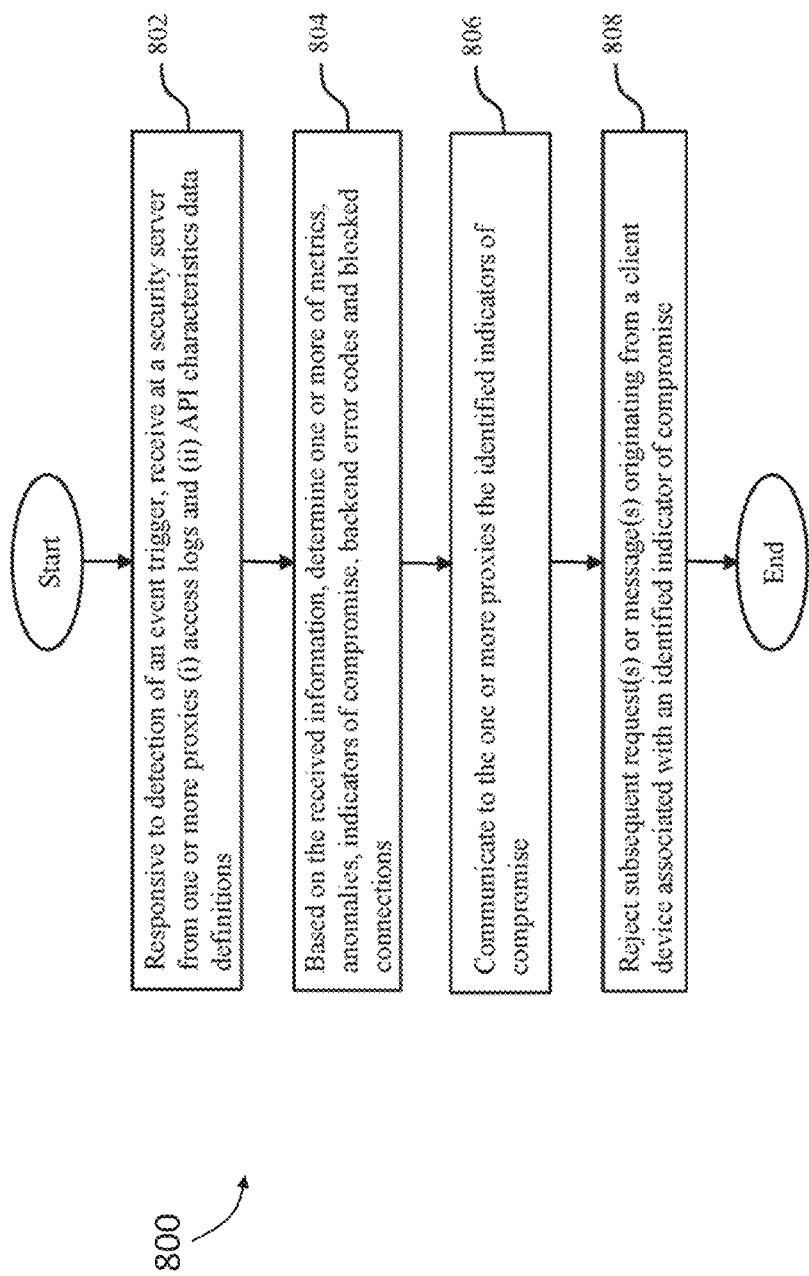

FIG. 8 illustrates a method 800 of securing a server or server backend, including in certain embodiments a server backend comprising one or more API servers. It would be understood that the method 800 may be implemented by a security server 408 that is in network communication with one or more than one proxies 404 of the type illustrated in FIG. 4.

At step 802, responsive to a trigger event, security server 408 receives from one or more than one proxies 404, (i) proxy access log information and (ii) API characteristics data definitions corresponding to the proxies. In an embodiment, security server 408 may additionally receive one or more of configuration data, session data, and security data corresponding to the proxies.

The trigger event may comprise any one or more triggers, including a periodic elapse of time based trigger. In an embodiment, the trigger event may comprise an elapse of time based trigger configured to trigger and reset upon elapse of a predetermined period of time. In some embodiments, the predetermined period of time can be between 30 seconds and 24 hours.

Example instances of proxy access log information may comprise one or more of (i) time stamp information corresponding to one or more communications received at or sent from a proxy, (ii) connection ID of a client communicating with a proxy, or with the server backend through the proxy, (iii) API name identified in a client request or message, (iv) API server to which a client request or message is transmitted by a proxy, (v) IP address and port of a client, (vi) client device, (vii) user agent, (viii) access URL, (ix) protocol) and/or protocol method (x) SSL information, (xi) header information, (xii) payload (if relevant), (xiii) error information, (xiv) response code, (xv) server errors. The above instances of proxy access log information are however provided as examples and not exhaustive.

It would be understood that by recording connection IDs of clients communicating with a proxy in respect of each client message or request, the present disclosure enables tracking and correlation of all communications associated with a particular client message or request (e.g. the message from the client to proxy, onward transmitted message from proxy to server, response from server to proxy and onward transmitted response from proxy to client), thereby enabling a consolidated tracking of incoming and outgoing communications through the proxy cluster, for security and monitoring purposes.

As discussed above, example, non-limiting API characteristics defined within each API characteristics data definition may include one or more of: (i) client side name associated with the API (i.e. external API name), (ii) server side name associated with the API (i.e. internal API name), (iii) hostname associated with the API, (iv) IP address of API server, (v) TCP port associated with the API on said API server, (vi) login URL or secure URL associated with the API, (vii) cookie information, (viii) communication protocols supported by the API (e.g. HTTP, WebSocket, MQTT, CoAP, etc.), (ix) HTTP methods or other protocol methods supported by the API (e.g. GET, POST, PUT, DELETE for HTTP, Streaming for Web Socket, Publish/Subscribe for MQTT etc.), and (x) content type supported by the API.

At step 804, the security server analyses information within the received access logs and API characteristics data definitions (and optionally within one or more of received configuration data, session data and security data corresponding to the proxies). Based on such analysis and one or more machine learning algorithms, the security server may generate, identify, or consolidate information relating to one or more of:

access log tracking—correlating connection IDs of clients with API usage metrics—one or more measurements of levels, types, and quantum of services (e.g., API communications or web services and associated API traffic) requested from or provided by the server backend through the one or more proxies with which the security server is in network communication. Example metrics may include or relate to performance characteristics such as number of request/response, client access URLs, number of user sessions/non sessions, most popular methods/client devices, most popular IPs, details of server responses including error codes, timing information for access, session ids, delay, provisioning, availability, restoration times for outages, average and maximum outages periods, average and maximum response times, latency, and delivery rates (i.e., throughput), actual session Quality of Service (QoS), traffic routes, payload size, response time, cookie types, number of requests, end-user application transactions, API name usage, API URL usage, total requests, successes, sessions, non-sessions, etc.

anomalies—one or more abnormal, unusual, unexpected, or strange artifacts, events, or trends in network characteristics (for example, characteristics such as traffic volume, bandwidth use, protocol use etc.) that could potentially indicate the presence of a threat or indicator of compromise. Example anomaly metrics may include total anomalies, most suspicious protocol methods, most suspicious device, and most suspicious IPs. Anomalies can be identified in comparison with a baseline of normal network or user behavior that has been established over a period of time. Once certain parameters have been defined as normal, departures from normal parameters or ranges may be flagged as anomalous.

indicator(s) of compromise—one or more artifacts or events in network characteristics that indicate with high confidence unauthorized access or attempts to achieve unauthorized access to a system or data. Indicators of compromise can be identified in comparison with a baseline of normal network or user behavior that has been established over a period of time. Once certain parameters have been defined as normal, departures from normal parameters or ranges may be flagged as indicators of compromise.

analysis of back end error codes—analysis of error codes returned by API servers within a server backend in response to an error associated with a client request or message. Example error code metrics may include what is the most frequent error code, how many errors, what can be causing the error (e.g. time, device type, load etc.).

blocked connections—clients that have been blocked by one or more proxies. Example blocked connection metrics may include identity of devices or users that are blocked, reasons for blocking, and statistics of blocking corresponding to various methods of blocking. Example methods of blocking include:

IOC—IP based blocking (based on indicators of compromise)

IOC—cookie based blocking (based on indicators of compromise)

Token based blocking

API key based blocking

User identity based blocking

API—protocol based blocking

API—method based blocking

API—content type based blocking

API—host name based blocking

API—name based blocking

Spike threshold (spikes in number of client side requests received per unit time) based blocking In implementation, the one or more machine learning algorithms discussed above may involve one or more of (i) dynamically creating a graph corresponding to each variable parameter (i.e. each parameter considered relevant for identifying or generating metrics, anomalies or indicators of compromise), (ii) identifying a baseline of acceptable variations of variable values, and (iii) identify deviations (indicative of indicators of compromise or anomalies) from such baselines.

At step 806, security server 408 communicates to the one or more proxies 404, one or more indicators of compromise identified at step 804. In some embodiments, the communication also includes a client device ID or a connection ID associated with each indicator of compromise. Each of the one or more proxies 404 may be configured to reject or discard one or more (and preferably all) subsequent client requests or messages from a client ID or connection ID associated with an indicator of compromise received from security server 408. In other words, after receiving an indicator of compromise from security server 408, the receiving proxies 404 subsequently block client messages or requests from clients or connection IDs associated with the received indicator of compromise from being transmitted onward to a target server backend, target API, or target API server, thereby securing the server backend from clients and connections associated with previously detected indicators of compromise.

Reverting to FIG. 5A, in the illustrated embodiment, proxy cluster 504 (comprising proxies 504a, 504b, 504c) is in network communication with security server cluster 508 (comprising security servers 5082, 5084, 5086) configured to receive API data from proxies within proxy cluster 504 and to enable implementation of API security with respect to server backend 506. In some embodiments, a single security server 508 can be used to implement the functions of a security server cluster including a plurality of security servers, as illustrated in FIG. 5D. In an embodiment, security servers 5082, 5084, 5086 within security server cluster 508 may be individually or collectively configured to implement the method of securing a server backend shown in FIG. 9.

Figure 5B:
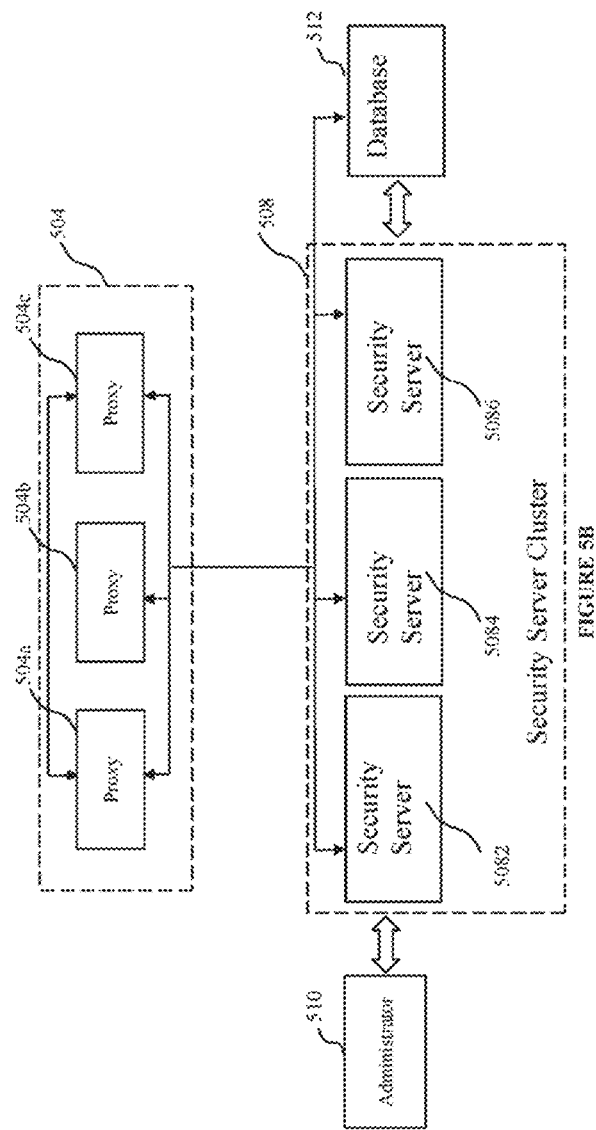

FIG. 5B illustrates a specific configuration of the network architecture, wherein security server cluster 508 comprises security servers 5082, 5084, and 5086, and each of the individual security servers may receive data from one or more proxies within proxy cluster 504. Security server cluster 508 may additionally be accessed and configured by system administrator 510 from a user terminal or through an API configured for this purpose. Security server cluster 508 (or individual servers therewithin) may additionally be communicably coupled with one or more databases 512, which databases may additionally be accessible by proxies within proxy cluster 504.

FIG. 9 illustrates a method 900 of securing a server or server backend, including in certain embodiments a server backend comprising one or more API servers. It would be understood that the method 900 may be implemented by a security server cluster 508 that is in network communication with a proxy cluster 504 comprising a plurality of proxies of the type illustrated in FIG. 4 (i.e. proxy 404).

At step 902, responsive to a trigger event:

(i) a first security server within security server cluster 508 receives from a first proxy (and possibly from other proxies) within proxy cluster 504:

(a) proxy access log information, and (b) API characteristics data definitions corresponding to at least said first proxy, (ii) a second security server within security server cluster 508 receives from a second proxy (and possibly from other proxies) within proxy cluster 504:

(c) proxy access log information, and (d) API characteristics data definitions corresponding to at least said second proxy.

In an embodiment, each of the first and second security servers may additionally receive one or more of configuration data, session data and security data corresponding to the first and second proxies respectively. It would additionally be understood that further (i.e. third and other) security servers within security cluster 508 may likewise receive from additional (i.e. third and other) proxies within proxy cluster 504, proxy access log information and API characteristics data definitions (and optionally one or more of configuration data, session data and security data) corresponding to said proxies.

In an embodiment, proxy log access information from at one proxy within the proxy cluster may be distributed among a plurality of security servers within the security server cluster. In an embodiment, each security server receiving proxy access log information from a proxy may additionally receive one or more of API characteristics data definitions, configuration data, session data, and security data from said proxy.

The trigger event(s), proxy access log information, and API characteristics data definitions may comprise any one or more of the embodiments discussed previously in connection with FIG. 8.

Step 904 comprises determining, generating, or consolidating, based on information received at the first security server, a first set of information comprising one or more of metrics, anomalies, indicators of compromise, back end error codes, and blocked connections of the kind discussed in connection with FIG. 8.

Step 906 comprises determining, generating, or consolidating, based on information received at the second security server, a second set of information comprising one or more of metrics, anomalies, indicators of compromise, back end error codes, and blocked connections of the kind discussed in connection with FIG. 8.

It would be understood that third and successive sets of information comprising one or more of metrics, anomalies, indicators of compromise, back end error codes, and blocked connections may likewise be determined, generated, or consolidated at each additional security server within security server cluster 508.

Step 908 comprises optionally persisting at least the first and second (and/or any other) sets of information generated at the security servers. Said sets of information may in an embodiment be persisted in one or more databases associated with the security server cluster.

Step 910 comprises communicating identified indicators of compromise corresponding to at least the first and second (and any other) sets of information generated by the security servers to at least one proxy and in some instances a plurality of (and in some instances all) proxies within proxy cluster 504. In an embodiment, step 910 comprises communicating correlated indicators of compromise corresponding to at least the first and second (and any other) sets of information generated by the security servers.

At step 912, one or more proxies 504 subsequently terminate a connection if still active, and reject or discard one or more (and in some instances all) subsequent client requests or messages from a client ID or connection ID associated with an indicator of compromise identified by or received from a security server within security server cluster 508, thereby securing the server backend from clients and connections that have been found responsible for previously detected indicators of compromise.

In an embodiment, at least one of the first set of information and the second set of information may be acquired by one or more of (i) capturing at each protocol specific data plane or TCP port specific data plane within the first proxy or second proxy, real time API traffic data routed through said data plane, (ii) for each data plane, generating a log uniquely corresponding to said data plane, wherein said log comprises captured real time API traffic data routed through said data plane, and (iii) persisting each generated log file along with a unique ID associated with the generated log file.

In some embodiments, in acquiring at least one of the first set of information and the second set of information, at least one data plane within the first proxy or second proxy has a plurality of sub-processes uniquely associated therewith. Capture of real time API traffic data routed through such data plane may comprise generating, for each sub-process associated with said data plane, a log uniquely corresponding to said sub-process, wherein said log comprises real time API traffic data routed by said sub-process.

It would be appreciated that receiving access logs and API characteristics data definitions (and optionally configuration data, session data or security data), from across a plurality of proxies within a proxy cluster, enables a security server or cluster of security servers to determine and consolidate metrics, anomalies, indicators of compromise, error codes, and blocked connection information with a cluster wide perspective (i.e. across all nodes of the proxy cluster) instead of on a proxy specific basis. The cluster wide perspective can improve the results of data analysis and for better identification of indicators of compromise.

Figure 5C:
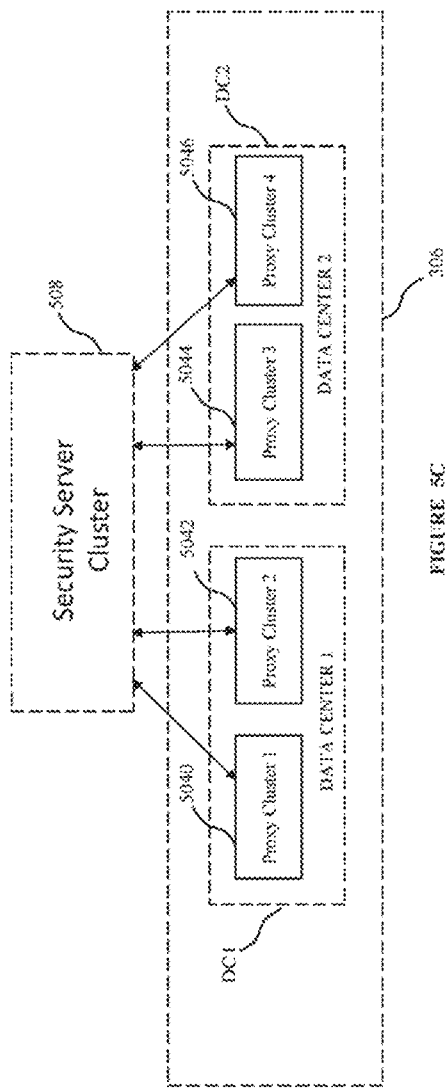
Figure 5D:
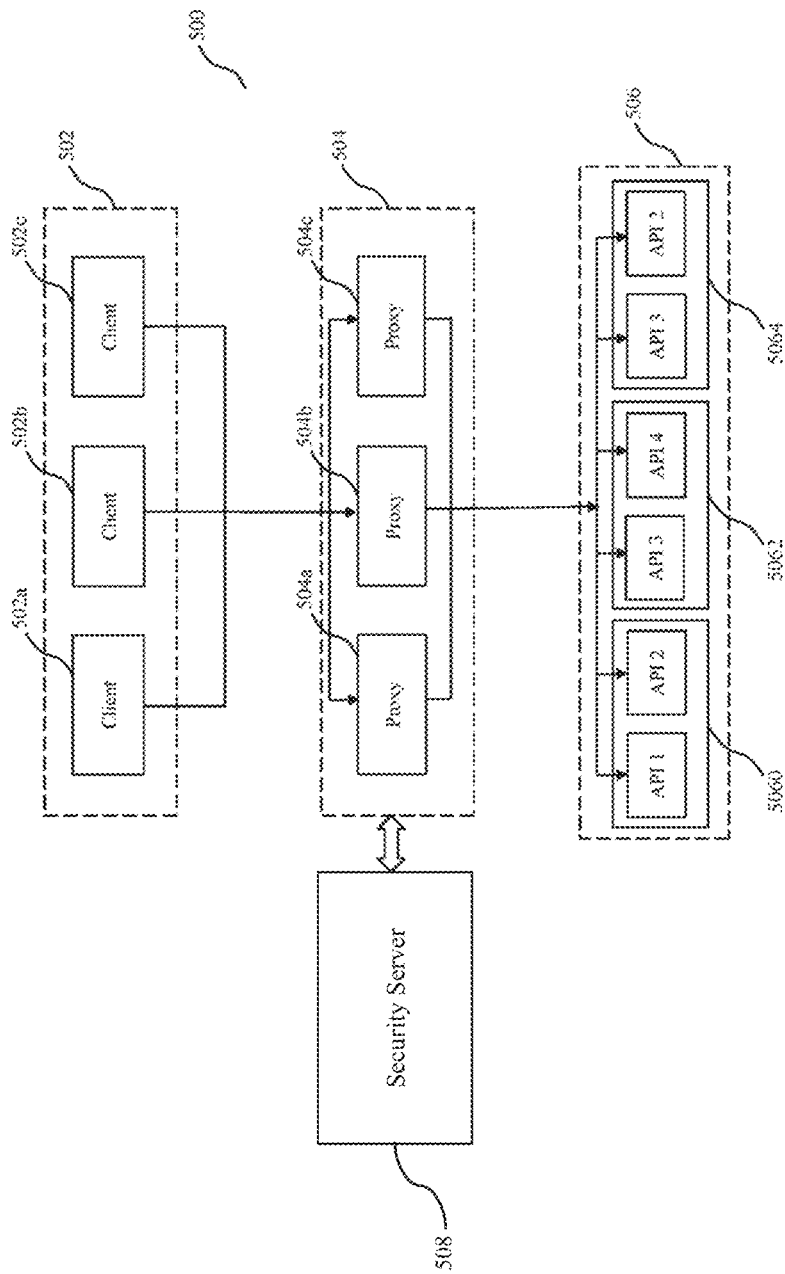

In addition, the data may be further analyzed and consolidated from across a plurality of clusters with machine learning etc. to further increase the level of security and for even better identification of indicators of compromise. FIG. 5C illustrates an embodiment where security server cluster 504 may receive data for analysis and consolidation from a plurality of proxy clusters. In an embodiment of the kind illustrated in FIG. 5C, a security server cluster 508 may be configured to receive data from multiple proxy clusters within a single data center—for example, from proxy cluster 1 (5040) and proxy cluster 2 (5042) within data center 1 (DC1) or from proxy cluster 3 (5044) and proxy cluster 4 (5046) within data center 2 (DC2). In another embodiment, also illustrated in FIG. 5C, the security server cluster 508 may be configured to receive data from multiple proxy clusters distributed across multiple data centers—for example from proxy cluster 1 (5040) and proxy cluster 2 (5042) within data center 1 (DC1) and also from proxy cluster 3 (5044) and proxy cluster 4 (5046) within data center 2 (DC2). It would be understood that proxies within a single proxy cluster may be distributed across a plurality of data centers or clouds or a combination thereof.

Increasing size of the set of cluster wide data has been found to present significantly improved results in view of the machine learning methods and algorithms used for the data analysis by the one or more security servers. Likewise, receiving data from proxy clusters located across data centers may provide improvements in results. By capturing data at proxies within a proxy cluster, and streaming data to a security server or a cluster of security servers, the present disclosure enables use of machine learning to create baselines and to identify deviations from baselines as indicative of anomalies and/or indicators of compromise. The generation of API access logs based on data captured at proxies, streaming of such access logs to one or more security servers, and transmission of anomaly information or indicator of compromise information back from the security servers (or a database associated with one or more security servers) back to the proxies provides efficient security mechanisms for blocking attacks on APIs implemented within one or more API servers within a server backend. It is to be noted that the data captured could also be streamed directly to the security servers without first placing it in logs.

Yet further, the security servers of the present disclosure are capable of responding to requests or messages corresponding to untrusted devices (i.e. client devices) as well as varying sets of coordinates (e.g. protocols, devices, client programs, URL types, data rates, bandwidths, all header types, request payloads etc.)—which enables systems, devices, and methods described herein to be implemented as a modular intermediary implemented directly in the public internet without requiring reconfiguration of a server backend.

Additionally, since the security cluster and security servers therein are not disposed as a communication intermediate between the proxy cluster and the server backend, the security solution of the present disclosure does not interfere with or create bottlenecks at any client access endpoints—and accordingly does not increase API latency or otherwise affect performance of a server backend.

In an embodiment, security server 408 or security server cluster 508 is provided with an input API which ensures that access log data and/or API characteristics data definitions (and optionally configuration data, session data or security data) for data analysis and identification of indicators of compromise may only be received from proxies within the proxy cluster—and that a security server(s) or data analysis module or security module within said security server(s) has no other channel of input. The input API may additionally be configured to require authentication of a proxy before receiving access logs and other information from such proxy.

The input API may in an embodiment additionally enable operator inputs for configuring the security server(s), including operator inputs that change one or more predefined thresholds for identification of indicators of compromise—so as to fine tune the accuracy of said security server(s) and/or reduce false positives or false negatives.

The input API may additionally be communicably coupled with a control API for receiving proxy access logs and API characteristics data definitions from each API proxy. The control API enables the security server cluster to manage data loss and organize received logs (corresponding to various APIs) from multiple proxies within the proxy cluster, and to use time stamps associated with such logs to correlate the various logged communications.

FIG. 10A illustrates a networking architecture 1000 that may be used to implement a method 1050 (illustrated in FIG. 10B) of securing a server backend comprising one or more resource servers (e.g., application servers, API servers, API gateways, mainframes, etc.). As illustrated in FIG. 10A, networking architecture 1000 comprises an access control server (or a cluster of access control servers) 1003 interpositioned as a gateway or communication intermediate between client(s) 1001 (comprising one or more client devices 1001a to 1001c) and resource server(s) 1007 (comprising one or more resource servers 1007a to 1007c). Each resource server 1007a to 1007c may in example embodiments comprise any of an API server, an application server, an API gateway, a mainframe, or any other server configured for responding to client terminal request(s) for services from a target API.

For the purposes of the embodiment of FIGS. 10A and 10B and corresponding claims), it would be understood that the term "access control server" may be used to refer to any one or more servers that are positioned as a communication intermediate between clients and one or more resource servers, and are configured to monitor and/or control and/or route and/or forward the transmission of server resource requests and server resource responses between said clients and said one or more resource servers. Non-limiting, example embodiments of access control servers for the purpose of the present disclosure can include routing servers, proxy servers, load balancers, caching servers, L2/L3 switch servers, gateway servers, web servers, application servers, API servers, API gateways, servers that authorize access to resources, etc.

Access control server(s) 1003 may be communicably coupled with both of security server 1005 and resource server(s) 1007 so as to route data or messages received at access control server(s) 1003 to either or both of security server 1005 or resource server(s) 1007.

While not specifically shown in FIG. 10A, it will be understood that access control server(s) 1003 may be (i) positioned as a communication intermediate between one or more proxies 404 or proxy clusters 504 of the type that have been described earlier in this specification or (ii) positioned such that one or more proxies 404 or proxy clusters 504 (of the type that have been described earlier in this specification) are positioned as a communication intermediate between access control server(s) 1003 and resource server(s) 1007 or (iii) implemented within one or more proxies 404 or proxy clusters 504 (of the type that have been described earlier in this specification).

Access control server(s) 1003 may comprise an access control device (for example a gateway server) or a cluster of access control devices that is/are configured to serve as a controlled or secured access point to resource server(s) 1007. In various embodiments, in addition to controlling access to resource server(s) 1007, access control server(s) 1003 may implement authentication, monitoring, load balancing, caching, request shaping and response handling, or other activities in connection with resource server(s) 1007.

Security server 1005 may be configured for implementing one or more security functions in connection with access control server(s) 1003, and may comprise of a unitary security server or a cluster of interconnected security servers which together may implement functions with a collection of modules so as to provide security functions for the system represented in FIG. 10A. Security server 1005 may be configured to function as one or both of (i) an artificial intelligence/neural network/machine learning/rule—based server configured to analyse network traffic data received from access control server(s) 1003 and to identify errors, anomalies or indicators of compromise based on said analysis, as well as detailed information as to the traffic going from clients to resource servers, and (ii) a server configured to enforce one or more security policies based on the results of said network traffic data analysis as well as based on the collection of anomalies and indicators of compromise collected from previous analysis or that has been communicated from external sources and is collectively maintained in a blacklist. In various embodiments the security server and the artificial intelligence/neural network/machine learning/ rule based server may be implemented with one or more modules on separate data processing devices or may be implemented within a single data processing device.

The functionality and operation of the network architecture 1000 of FIG. 10A is illustrated in connection with the method 1050 of securing a server or server backend, which includes, in certain embodiments, a server backend comprising one or more resource servers. It would be understood that the method 1050 may be implemented by a single security server 1005 that is in network communication with a single access control server 1003 (or in an embodiment, through a cluster of access control servers, each of which is configured to independently or collaboratively perform the functions of access control server 1003 discussed above), or through a cluster of security servers (of the type illustrated as security server 1005) that are in network communication with a single access control server 1003 or with a cluster of access control servers (each configured to independently or collaboratively perform the functions of access control server 1003 discussed above).

At step 1002, security server 1005 receives from access control server 1003 server (i) resource request information corresponding to one or more server resource requests received at the access control server 1003, and (ii) server resource characteristics data definitions corresponding to the server resource being accessed or requested by the client(s) 1001 or requesting terminal device 1001 via the access control server 1003. In a specific embodiment where the resource server is an API server, the security server 1005 receives from access control server 1003, server resource request information corresponding to one or more API requests received at the access control server 1003 and API characteristics data definitions corresponding to the API being accessed or requested by the client(s) 1001 or by requesting terminal device 1001 via the access control server 1003.

The server resource characteristics data definitions corresponding to the server resources being accessed by the clients may be communicated to the security server at any time—for example, in real time in response to a server resource being accessed by or communicating with a client, or at defined data synchronization intervals, or at the time a new server resource (for example a new API) is implemented, etc. The data received at step 1002 comprises data corresponding to a server resource request received from a client terminal 1001 or from a requesting terminal device 1001. Access control server 1003 may be configured to transmit to security server 1005, (i) said server resource request information corresponding to one or more server resource requests received at access control server 1003 and (ii) server resource characteristics data definitions corresponding to every received server resource request, (or in an alternative embodiment, server resource characteristics data definition that correspond to certain specific received server resource requests, which may be identified based on one or more predefined rules or one or more defined trigger events).

In one embodiment, the server resource request information and the server resource characteristics data definition corresponding to the server resources (for example APIs) being accessed may be communicated via access logs recorded at access control server 1003. In another embodiment, the server resource request information and the server resource characteristics data definition corresponding to said server resources being accessed may be directly transmitted or streamed to security server 1005 without recording such data in one or more data logs or prior to or simultaneously with recording of such data in one or more data logs.

In some embodiments, the information received by security server 1005 at step 1002 comprises any of the information described previously in this specification, including (but is not limited to) one or more of (i) time stamp information corresponding to one or more communications received by access control server 1003 from a requesting client 1001, (ii) connection ID of a client 1001 communicating with the access control server 1003, (iii) connection ID of a client 1001 that has generated the server resource request, (iv) server resource name (e.g. the API name) identified in a client request or message, (v) resource server (e.g. an API server) to which a client message is subsequently transmitted by the access control server 1003, (vi) in case of messages received from client(s) 1001, any of source IP address, source port information, method or command used, URL and URL information, protocol information and version number, content type, host accessed information, content type, content length, client information, user agent information, API key, authorization information in the form of token, or cookie, or other types, (vii) in case of responses received from resource server(s) 1007, any of response code, response status, content type, content length, authorization information, etc., (viii) client device name or model, (ix) user agent, (x) access URL, (xi) protocol and/or protocol method, (xii) SSL information, (xiii) header information for all types of headers, and (xiv) payload (if relevant). The information received at step 1002 may be stored in one or more databases (or other storage means, for example, file servers, etc.) associated with or accessible by security server 1005, to enable future pattern recognition.

At step 1004, based on the information received at security server 1005 from access control server 1003, an analysis engine (for example a machine learning/artificial intelligence driven analysis engine and/or rule-based engine) that is coupled with or implemented within security server 1005 analyses the server resource request received at access control server 1003 for identifying corresponding metrics, anomalies, indicators of compromise, backend error codes, or whether said server resource request has originated from a blocked connection or from a client 1001 that is included on a blacklist maintained by security server 1005. The machine learning analysis at step 1004 may include any of the one or more embodiments discussed previously in this specification, and in certain embodiments may involve one or more of (but are not limited to), of (i) dynamically creating a graph corresponding to each variable parameter (i.e. each parameter considered relevant for identifying or generating metrics, anomalies or indicators of compromise), (ii) identifying a baseline of acceptable variations of variable values, and (iii) identify deviations (indicative of indicators of compromise or anomalies) from such baselines, or (iv) applying any machine learning algorithm, AI algorithm, or any rule-based algorithm.

The machine learning analysis at step 1004 is used to initiate a first security response. In an embodiment, one or more (and in an embodiment, all) indicators of compromise that have been detected in accordance with any of the apparatuses or methods described above, may be retrievably stored in a blacklist (e.g. a blacklist maintained in a database, or file, etc.). Along with each recorded indicator of compromise, the blacklist additionally stores information describing source (i.e. originating connection) characteristics associated with said indicator of compromise, such as an IP address of a terminal from which a server resource request (e.g. an API request) has originated, token used, cookie used, API key used, or any other characteristic(s) that are relevant to source identification. In some embodiments, such information can also be augmented with information retrieved from or communicated by outside sources.

In some embodiments, the one or more anomalies, errors, or indicators of compromise may be detected if the client or terminal, from which the server resource request has originated, is identified as being included in the blacklist. In some embodiments, such identification may be based on the requesting client/terminal IP address, cookie used, token used, API key used or on any other characteristic data that is relevant to source identification and that is stored in the blacklist. Responsive to detection of one or more anomalies, errors, or indicators of compromise by security server 1005, the first security response may include transmitting, from security server 1005 to access control server 1003, information corresponding to the identified anomalies, errors or indicators of compromise. Thereafter, access control server 1003 may prevent the server resource request message or server resource request from the concerned client 1001 from being forwarded onward to the resource server(s) 1007 or to a target server resource or target API. The first security response may additionally comprise transmitting, from security server 1005 to access control server 1003, an instruction to prevent the server resource request message or server resource request or API request from the concerned client 1001 from being forwarded onward to the resource server(s) 1007 or to a target server resource or target API. In some embodiments, depending on the timing, the first server resource request message or server resource request or API request may be transmitted to the target resource server(s) 1007 or the target server resource or target API, while (i) the next server resource request message (or one or more subsequent server resource request messages) received from the same client 1001 will be prevented from being forwarded to the resource server(s) 1007/target server resource/target API and/or (ii) a response from the concerned resource server(s) 1007/target server resource/target API will be prevented from being forwarded to the client 1001 from which said request server resource request message originated.

In the embodiment illustrated in FIG. 10B, at step 1006, responsive to the first security response including a determination that the server resource request does not violate one or more defined security policies (i.e. responsive to the analysis at step 1004 indicating absence of any (or any significant) errors, anomalies or indicators of compromise), security server 1005 may transmit to access control server 1003 a transmission approval message corresponding to the server resource request. In an embodiment, the transmission approval message may include data indicating absence of any (or any significant) errors, anomalies, or indicators of compromise corresponding to the server resource request. In another embodiment, the transmission approval message may include an instruction for access control server 1003 to transmit the server resource request onward to the resource server(s) 1007 or to a target server resource or target API. In another embodiment there may be no transmission approval message sent to access control server and in which embodiment, access control server 1003 may be configured to interpret the lack of a response or instruction from security server 1005 as an indication of an absence of errors, anomalies, or indicators of compromise, and that the access control server 1003 may permit the concerned client 1001 and the concerned resource server(s) 1007 to communicate in a normal manner.

Step 1008 comprises transmission of the server resource request from access control server 1003 to a target server resource within resource server(s) 1007.

At step 1010, security server 1005 receives from access control server 1003, server resource response information corresponding to a server resource response message transmitted by the target resource server(s) 1007 through access control server 1003 and onward to the client 1001 associated with the server resource request that has been previously analysed at step 1004. The information received by security server 1005 at step 1010 comprises any of the information described previously in this specification, and in some embodiments may include (but is not limited to) one or more of (i) time stamp information corresponding to the server resource response message received by access control server 1003 from the corresponding resource server(s) 1007, (ii) connection ID of the resource server(s) 1007 that is sending the server resource response message (e.g., identifying the access control server—resource server connection), (iii) connection ID (e.g., identifying the access control server—client connection) of the client to whom the server resource response message is being forwarded, (iii) server resource name/API name corresponding to the responding server resource/API, (iv) resource server(s) 1007 that has generated the server resource response message, (v) IP address or port of the responding resource server(s) 1007, (vi) in case of messages received from client(s) 1001, client device name or model, user agent, any of source IP address, source port information, method or command used, URL and URL information or access URL, protocol and/or protocol method, other protocol information such as protocol version number, SSL information, header information, content type, host accessed information, content type, content length, client information, user agent information, payload (if relevant), authorization information in the form of token, or cookie, API key, or other types, and (vii) in case of responses received from resource server(s) 1007, response code, response status, content type, content length, authorization information, etc. The information received at step 1010 may be stored in one or more databases (or other storage means, such as a file server etc.) associated with security server 1005 to enable future pattern recognition.

In an embodiment, the information related to a server resource request (for example, an API request) and the information related to the corresponding server resource response (for example, an API response) are associated or correlated with each other at security server 1005 so as to, for example, improve pattern recognition by security server 1005. In some embodiments, such association or correlation can be achieved based on several methods. In some embodiments, such association or correlation can be achieved based on the connection ID assigned to a server resource request. In some embodiments, such association or correlation can be achieved based on any other logical data element or data key. In some embodiments, such association or correlation can be achieved based on any correlation method that relies on one or more elements of data contained in (a) the server resource request received from the requesting client, and (b) the server resource response received from the responding server or server resource (e.g. responding API server or API), and these one or more elements can identify the access control server—client connection between access control server 1003 and the client 1001 from which the server resource request has been received. In various embodiments, this connection ID, or logical data element, or logical data key may be included both in the information sent by access control server 1003 to security server 1005 at step 1002 and at step 1010.

Step 1012 comprises analysing, at the analysis engine (for example a machine learning/artificial intelligence driven analysis engine or a rule based engine) that is coupled with or implemented within security server 1005, the information received at step 1010 for identifying corresponding metrics, anomalies, indicators of compromise, and/or backend error codes. The machine learning analysis at step 1012 may include any of the one or more embodiments discussed previously in this specification, and in some embodiments may involve one or more, but is not limited to, of (i) dynamically creating a graph corresponding to each variable parameter (i.e. each parameter considered relevant for identifying or generating metrics, anomalies or indicators of compromise), (ii) identifying a baseline of acceptable variations of variable values, and (iii) identify deviations (indicative of indicators of compromise or anomalies) from such baselines or (iv) applying any machine learning algorithm, AI algorithm, or any rule-based algorithm. The machine learning analysis or rule based analysis at step 1012 is used to initiate a second security response. In an embodiment, responsive to identification of any indicator of compromise or anomalies, information associated with said indicator of compromise that has been detected, may be retrievably stored in a blacklist (e.g. a blacklist maintained on a database). In some embodiments, along with each recorded indicator of compromise, the blacklist can additionally store information describing source characteristics associated with said indicator of compromise, such as an IP address of a terminal from which an API request has originated, token used, cookie used, API key used, or any other characteristic(s) that are relevant to source identification. In some embodiments, such information can also be augmented with information retrieved from or communicated by outside sources.

Responsive to the analysis at step 1012 detecting any anomalies, errors or indicators of compromise, the second security response may include transmitting, from security server 1005 to access control server 1003, information corresponding to the identified anomalies, errors or indicators of compromise, whereafter access control server 1003 may prevent the server resource response message received from the resource server(s) 1007 from being forwarded onward to the target client 1001. The second security response may additionally comprise transmitting from security server 1005 to access control server 1003 an instruction to prevent the server resource response message from the concerned resource server(s) 1007 from being forwarded onward to the target client 1001 and/or instructions to prevent any subsequent server resource requests received from the target client 1001 from being forwarded to the resource server(s) 1007. In another embodiment, responsive to detecting any anomalies, errors or indicators of compromise, the second security response may comprise updating the blacklist with information identifying the client 1001 responsible for generating the server resource request that has been identified as relating to an anomaly, error or indicator of compromise, and blocking future requests from such client 1001 from being transmitted to resource server(s) 1007, while permitting a server resource response to the server resource request received at step 1002 to be sent from the concerned resource server(s) 1007 to the requesting client 1001.

Alternatively, responsive to the second security response including a determination that the server resource response message does not violate one or more defined security policies (i.e. responsive to the analysis at step 1012 indicating absence of any (or any significant) errors, anomalies or indicators of compromise, security server 1005 may additionally transmit to access control server 1003 a transmission approval message corresponding to the server resource response message. In an embodiment, the transmission approval message may simply include data indicating absence of any (or any significant) errors, anomalies, or indicators of compromise corresponding to the server resource response message. In another embodiment, the transmission approval message may include an instruction for access control server 1003 to transmit the server resource response message onward to the target client 1001. In another embodiment, responsive to the second security response including a determination that the server resource response message does not violate one or more defined security policies (i.e. responsive to the analysis at step 1012 indicating absence of any (or any significant) errors, anomalies, or indicators of compromise, security server 1005 may take no further action (for example, security server 1005 may send no message or instruction to access control server 1003), in which embodiment access control server 1003 may be configured to interpret the lack of a response or instruction from security server 1005 as an indication of an absence of errors, anomalies, or indicators of compromise, and that the access control server 1003 may permit the concerned client 1001 and the concerned resource server(s) 1007 to communicate in a normal manner.

In some embodiments, in addition to server resource request data and server resource response data received from access control server 1003, security server 1005 may be configured to rely (for the purposes of identifying anomalies, errors or indicators of compromise at step 1004 and/or step 1012 of FIG. 10B) on data retrieved from other sources, including without limitation, an IP reputation database or a database of threat information or attack information collected by third parties or third party servers using other means. Such information may or may not already be made part of the blacklist that is maintained or accessible by security server 1005.

At step 1014, the server resource request data (received by the security server 1005 at step 1002) and the server resource response data (received by the security server 1005 at step 1010) and/or data generated by the corresponding analysis at steps 1004 and 1012 are optionally provided as input to the analysis engine implemented within or coupled with security server 1005, and the input can be used for training or updating a state of the analysis engine's anomaly detection capabilities and/or indicator of compromise detection capabilities, and/or one or more blacklists, white lists or lists of errors, anomalies or indicators of compromise maintained or accessed by the analysis engine.

In some embodiments, communication between security server 1005 and access control server 1003 may include the step of verification of the identity of access control server 1003 by security server 1005. Said verification may be achieved in a number of different ways, including, without limitation, access token based verification methods, or any other method of securely identifying and authorizing the access control server communication with the security server. The verification can be configured to ensure that data received in real time or access log data and/or server resource characteristics data definitions (and optionally configuration data, session data or security data) for data analysis and identification of errors, anomalies or other indicators of compromise may be received from access control server 1003 (or from a specified set of gateway devices which includes access control server 1003), and that security server(s) 1005 or one or more analysis engine(s) or database(s) implemented within or coupled to said security server 1005 is insulated or secured from receipt of unauthorized or harmful data. Therefore, the verification can preserve the integrity of the security server 1005 and its components and data.

In some embodiments, the verification can be implemented at or through security server 1005 using access token based verification (for example OAuth token based verification or any other Open ID token based verification of access control server 1003). The token-based verification includes an initial authentication of the access control server 1003 and issuance of an access token to said access control server 1003. The issued access token is stored by access control server 1003 and is periodically submitted by access control server 1003 to security server 1005, along with data transmitted from access control server 1003 to security server 1005. Security server 1005 may use the submitted access token to verify the identity of access control server 1003 and subject to such verification, use the data received from access control server 1003 as input. In the event security server 1005 fails to verify the identity of access control server 1003 (for example, in the event access control server 1003 is unable to transmit a validly generated access token, or in the event the transmitted access token does not match one or more access token records maintained by security server 1005), the security server 1005 can use such failure of verification as the basis for rejection of the data received from access control server 1003. For example, the security server 1005 does not use such data as input to any of security server(s) 1005 or one or more analysis engine(s) or database(s) implemented within or coupled to said security server 1005. While the embodiment discussed in this paragraph contemplates access token based verification of access control server 1003 by security server 1005, it would be understood that the verification may be alternatively achieved in multiple other ways.

The method 1050 illustrated in FIG. 10B can be implemented by any of (i) a network architecture comprising a single access control server 1003 interposed as a gateway to one or more backend resource servers, said access control server communicably coupled with a single security server, (ii) a plurality of access control servers communicably coupled to a plurality of security servers, or (iii) a plurality of access control servers communicably coupled with a single security server.

In some embodiments, the method 1050 is implemented based on a network architecture comprising a plurality of access control servers communicably coupled to a plurality of security servers. In these embodiments, one or more (and preferably each) access control server within the plurality of access control servers are configured such that responsive to a server resource request being received from a client terminal at an access control server, the same security server from the plurality of security servers is used to analyze both the server resource request information and the corresponding server resource response information. The server resource request information includes data corresponding to the received resource server request (e.g., gateway access log information or information passed on in real time to the security server corresponding to one or more server resource requests received at the access control server) and/or server resource characteristics data definitions corresponding to the access control server that is received at the security server at step 1002. The server resource response information includes a response message transmitted by the target resource server in response to said server resource request and received at the security server at step 1010. Using the same security server to process the correlated server resource request and response can significantly improve machine based recognition of errors, anomalies and/or indicators of compromise.

For the purposes of the embodiment discussed in connection with FIG. 10B, instances of access control server request information corresponding to one or more server resource requests and responses received at the access control server, may comprise one or more of (i) time stamp information corresponding to one or more communications received at or sent from an access control server, (ii) connection ID of a client communicating with an access control server, or with the server backend through the access control server, (iii) server resource name (e.g. API name) identified in a client request or message, (iv) resource server to which a client request or message is transmitted by an access control server, (v) IP address and port of a client, Token, API key, cookie used, (vi) client device, (vii) user agent, (viii) access URL, (ix) protocol and/or protocol method (x) SSL information, (xi) header information from all headers, (xii) payload (if relevant), (xiii) error information, (xiv) response code, and (xv) server errors. The above instances of access control server request information are however provided as examples and not exhaustive, and it would be understood that said information may include any one or more instances of server resource request information and server resource response information discussed in detail in connection with steps 1002 and 1010 of FIG. 10B.

Likewise, for the purposes of the embodiment discussed in connection with FIG. 10B, example, non-limiting server resource characteristics defined within each server resource characteristics data definition may include one or more of: (i) client side name associated with the server resource/API (e.g. external API name), (ii) server side name associated with the server resource/API (e.g. internal API name), (iii) hostname associated with the server resource/API, (iv) IP address of resource server/API server, (v) TCP port associated with the server resource/API on said resource server/API server, (vi) login URL or secure URL associated with the server resource/API, (vii) cookie information, token information (viii) communication protocols supported by the server resource/API (e.g. HTTP, WebSocket, MQTT, CoAP, etc.), (ix) HTTP methods or other protocol methods supported by the server resource/API (e.g. GET, POST, PUT, DELETE for HTTP, Streaming for WebSocket, Publish/Subscribe for MQTT etc.), and (x) content type supported by the server resource/API.

In one embodiment of FIG. 10B, access control server 1003 may be configured to extract and forward, to security server(s) 1005, header information and/or other types of information extracted from access control server, access request information corresponding to one or more resource server requests received at the access control server from one or more clients, and/or header information extracted from gateway access response information corresponding to one or more server resource response messages received at the access control server 1003 from resource server(s) 1007. The header information may be forwarded to security server(s) 1005 without transmitting to security server(s) 1005 corresponding payload information of said server resource request messages and/or server resource response messages received at the access control server. In another embodiment, the header information may be forwarded to security server(s) 1005 along with corresponding payload information of said server resource request messages and/or server resource response messages received at the access control server.

In some embodiments, header information extracted from server resource requests and/or server resource responses are forwarded in real time to security server(s) 1005 for the purpose of identifying real time indicators of compromise detection and blocking. In some other embodiments, header information extracted from server resource requests and/or server resource responses are forwarded asynchronously or on a batch basis or with logs to security server(s) 1005 for updating/training indicator of compromise detection capabilities of security server(s) 1005 and/or any analytics engine coupled with or implemented within security server(s) 1005.

In addition to the methods and system described above, the present disclosure provides additional methods and systems for responding to detected unauthorized or malicious attempts to access a target API or API server.

It has been found that to achieve unauthorized access, attackers typically use a large number (or various different types) of client devices, IP devices, and client-IDs to hide their identity. Further, before they launch a full attack on any API, attackers typically scan an API server or a front-end intermediate server to discover the various APIs hosted on one or more API servers (or on one or more API servers' back-end) and their characteristics. In certain cases, scanning a server may involve brute-force based or dictionary based (or a combination thereof) attempts to discover APIs hosted on an API server or API back-end. Once an API is discovered through scanning, the client device/IP device tries to contact the discovered API by sending messages/queries to said API to obtain responses and further information about such APIs.

Some embodiments described herein address this attacking methodology by including one or more decoy/dummy/fake/inactive/replica APIs ("decoy API") within access control server/API gateway of the type discussed above (or in other embodiments, within any other front-end or backend network devices), including but not limited to load balancers, any type of proxies, API servers, application servers, resource servers, network device, etc. The decoy API may in an embodiment be non-functional and may be implemented by way of multiple instances on one or more servers or network devices, preferably with different/differing/misleading API names. The decoy API may be of any type, including without limitation REST/HTTP, Web Socket, MQTT APIs, COAP, AMQP and any other API type used for data transfer. In an embodiment, decoy API names may be selected to avoid overlap with names of genuine/functional APIs implemented on an API server backend.

The API gateway and/or API front-end implemented (including client application software, application website code and/or DNS lookup entries) may be carefully designed to ensure that names of the decoy APIs are not made available as a consequence of any legitimate use/access of an API server. Since the decoy API is not used in any legitimate application or by a regular user having legitimate intent to access, these decoy APIs are discovered by a user (i.e. hacker) who scans APIs on the API server backend on which they are implemented (for example, using botnets or other techniques), and therefore such user would be those that attempt to use them/access them. The API gateway is accordingly configured to treat any request or message directed to a decoy API (e.g. indicating the decoy API as the target API) as suspicious, and as indicating an anomaly or attack (or attempt to attack) to the APIs/API servers. In some embodiments, the API gateway may be configured to redirect all such requests or messages to a security server communicably coupled with the API gateway.

Figure 11:
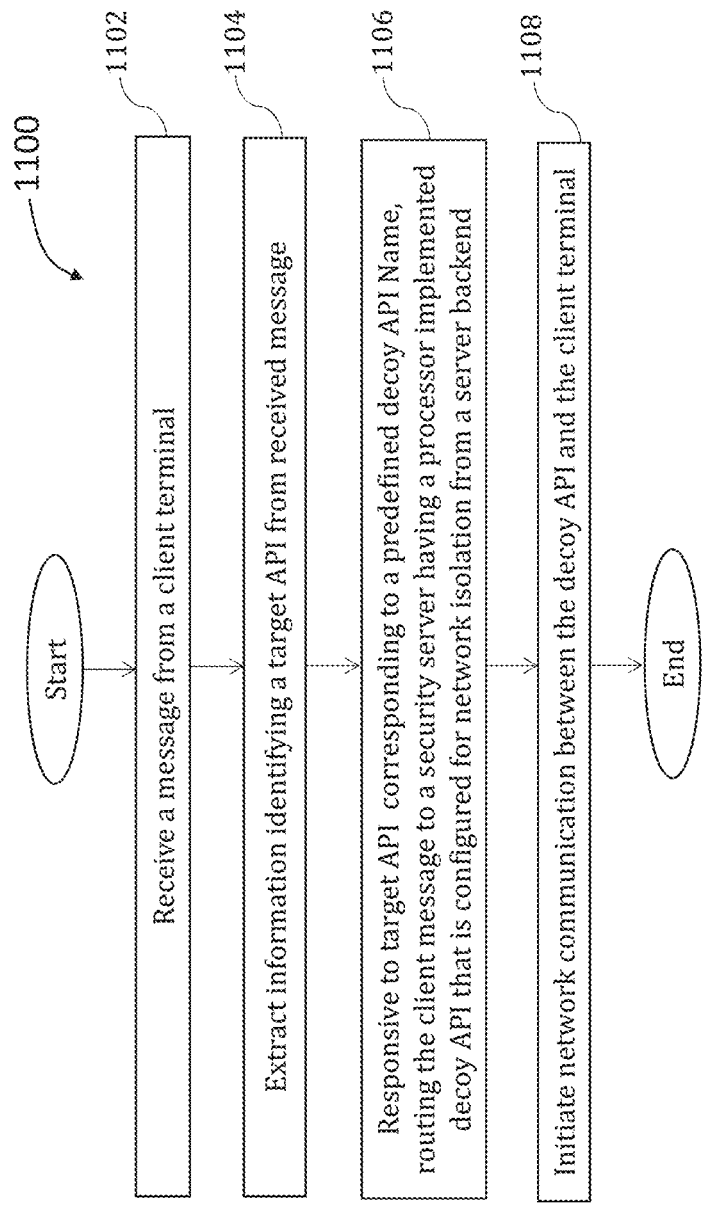

FIG. 11 illustrates an example method 1100 for implementing decoy API based API/application security.

Step 1102 comprises receiving a client message or client request from a client terminal. In an embodiment, the client message or client request is received at an API gateway of the type described above in this specification (e.g., the API gateway is disposed intermediate to clients and a server backend). Step 1104 involves extracting information identifying a target API from the received message. At step 1106, responsive to the identified target message corresponding to the API name of a decoy API, the client message is routed to a security server (of a type or configuration described hereinabove) for further processing. In an embodiment, said security server may include therewithin, a processor implemented decoy API corresponding to the API name extracted from the identified target message. The processor implemented decoy API can be configured for network isolation from the API server backend.

Step 1106 comprises initiating network communication between the decoy API and the client terminal, for the purposes of interacting with attackers and obtaining more information about the attackers and the attack patterns. In an embodiment, the information received by the decoy API may be analyzed for detecting and identifying one or more attack patterns. The attack patterns and data characteristics corresponding to said attack patterns may thereafter be added to a data historian of attack patterns or a library of indicators of compromise. In this manner, the proxy may respond to future instances or detection of similar or identical attack patterns, by rejecting or discarding or appropriately re-routing the client messages responsible for such future instances of similar or identical attack patterns. In various embodiments, data that is added to the data historian may include one or more of originating client device name or model, user agent, any of source IP address, source port information, method or command used, URL and URL information or access URL, protocol and/or protocol method, other protocol information such as protocol version number, SSL information, header information, content type, host accessed information, content type, content length, client information, user agent information, token or cookie information, API key information, payload (if relevant), and authorization information in the form of token, or cookie, or other types, corresponding to messages or requests received from the attacking terminal.

By isolating the decoy API from the server backend, the method 1100 ensures that malicious or probing client messages seeking to obtain unauthorized server access are prevented from being routed to the server and causing any damage or harm or unauthorizedly accessing or extracting data from the system. Additionally, the decoy APIs are, in an embodiment, purposefully designed to interact with attackers using real or fake data to get various levels of insight into attackers' methods and devices used. Such insights can include, e.g., user agents, any information used to identify the source of the probing client, time of access, volume of traffic, etc. The method 1100 can also include storing and sharing the data and communication characteristics, and any additional information identifying the suspicious connections. Such information may be used by systems to drop those connections immediately, continue observing the hacker's activities with respect to those decoy APIs, report those connections via alerts, email and other means of communications, display information dashboards, provide comprehensive reports, etc. In an embodiment, one or more decoy APIs may be stored either within an API gateway server or within a security server or other server communicably coupled with an API gateway—either under the same, similar or distinct API names.

The method 1100 allows creation of decoy APIs which to a hacker or malicious device would appear to have a normal API path (i.e., to create a deception environment). The deception environment may be used to capture various information on the API hackers and to also continue to observe the action of the hacker on the APIs.

In an embodiment, a decoy API may be configured either as an out-of-context API or as an in-context API.

Out of context API—including a standalone decoy API which is independent of real APIs. To make it appear like other APIs, additional URLs may be generated to represent API paths to mislead attackers.

In context API—including a decoy API created as a list of URLs within a real API. The URLs are mixed with URLs of real API paths, but each path is unique and does not lead to the protected server backend.

It would be understood that decoy APIs can be implemented without changes or updates to backend application servers. Even when the decoy API uses the root of an existing API, the application server operates independently without any awareness of the decoy API(s).

Implementing decoy APIs creates an API deception environment that may be configured to respond to attackers with fake responses which can be defined by the administrator of the API gateway and/or security server. The sequence of attacker requests and the traffic generated by the attacker in communicating with the decoy API represents an attack pattern to analyze. This sequence can be captured and used for forensic analysis.

In an embodiment, payload and metadata received from an attacker at a decoy API may be processed by the security server for further analysis.

In an embodiment, response to identification of clients which are attacking real APIs, requests and data messages from such attacking clients (or any other hacker traffic) can be redirected to the security server for further real-time observation and analysis. In some embodiments, the security server captures data representing one or more (and in some instances all) of the commands or methods used by a client that has been identified as an attacker, threat or anomaly, and the associated data and payloads etc., and such data may be used to observe, record and analyze the attacking techniques.

The decoy API and the security server may be configured to respond to the attacker and record the interaction to learn attack patterns. In the event a client or device that has been identified as an attacker by the decoy API or by the security server subsequently attempts to access a valid API path, the client session may be terminated. In an embodiment, the information received by the decoy API or the security server may be analyzed for detecting and identifying one or more attack patterns. The attack patterns may thereafter by added to a data historian configured to store attack patterns or to a library of indicators of compromise. Accordingly, the API gateway may respond to future instances of detection of similar or identical attack patterns, by rejecting or discarding or appropriately re-routing the client messages responsible for such future instances of similar or identical attack patterns.

In some embodiments, either of the API gateway or the security server may be configured to generate and transmits a report or alert for each API data message that is addressed to an invalid or non-existent API name.

Figure 12:
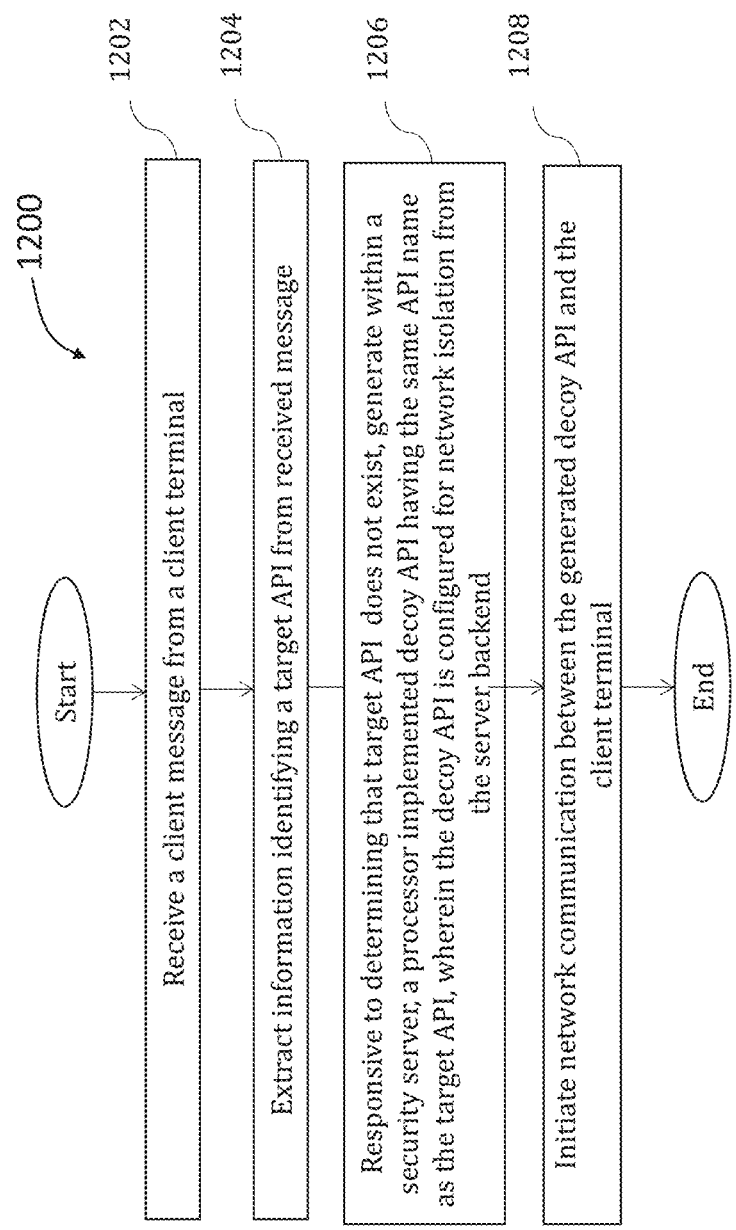

In an embodiment, one or more decoy APIs can be dynamically created based on the API path names that the attacker tries on the system, and which currently do not exist, as the attacker probes the system to discover a way in. FIG. 12 illustrates an example method 1200 of securing a server by dynamically creating decoy APIs.

Step 1202 comprises receiving a client message or client request from a client terminal. In some embodiments, the client message or client request may be received at an API gateway of the type described above in this specification (e.g., an API gateway disposed intermediate to clients and a server backend). Step 1204 comprises extracting information identifying a target API from the received message. Responsive to determining that the target API does not exist, it can be concluded that the client message may be part of a probe, scan, or brute force attack to gain unauthorized access to a server backend. At step 1206, the method 1200 includes responding to the client message or client request by generating a decoy API having the same API name as the target API. In an embodiment, the decoy API having the same API name as the target API is generated within a security server (of a type or configuration described hereinabove), and is configured for network isolation from the API server backend.

Step 1208 comprises initiating network communication between the generated decoy API and the client terminal, for the purposes of, e.g., interacting with attackers and obtaining more information about the attackers and the attack patterns.

The method 1200 illustrated in FIG. 12 enables responding to attackers who are found to be probing an unused API path, by automatically generating a decoy API corresponding to that unused API path and having the name of the API path that the attacker has probed. This created new decoy API is configured in a manner that it is ready to capture the same or a different attacker activity as soon as the attacker begins to interact with said decoy API. This process automates the creation and configuration of decoy APIs based on actual attacker activity. It would additionally be understood that the method 1200 illustrated in FIG. 12 (of generating new decoy APIs in response to an attacker probe for such API) may be carried out either automatically or manually. In a particularly embodiment, such new decoy APIs may be generated or set up by system users, system operators, system administrators, DevOps, or by any party having system permissions to do so.

FIG. 13 illustrates an embodiment of a system 1300 configured to implement the methods of FIGS. 11 and 12. The system 1300 includes API gateway (or access control server) 1304 disposed as a network intermediate between one or more instances of client(s) 1302 (comprising example client terminal devices 1302a and 1302b and bots 1302c and 1302d) and a server backend 1308 comprising a plurality of servers 1308a and 1308b. API gateway 1304 is communicably coupled with a security server 1306, which comprises one or more processor implemented decoy APIs 1306a, a processor implemented decoy API generator 1306b, and decoy traffic historian 1306c.

It would be understood that API gateway 1304 may be configured to select between routing a client message to server backend 1308 and routing the client message to security server 1306. In an embodiment, API gateway 1304 may be configured (i) to respond to receipt of client messages that identify a target API that is legitimate and hosted on the server backend 1308 by routing said client message to the target API on server backend 1308, and (ii) alternatively, to respond to receipt of client messages that identify a target API that matches the name of a decoy API, or which target API does not exist, by routing said client message to security server 1306. If a decoy API 1306a corresponding to the target API identified in the client message already exists within security server 1306, the client message may be routed to such decoy API(s) 1306a. In the event no existing decoy API matches the target API identified in the client message, decoy API generator 1306b generates a decoy API 1306a that matches the name of the target API—and the client message is thereafter routed to the generated decoy API 1306a.

As discussed above, decoy APIs 1306a may be configured to interact with attackers using real or fake data to get various levels of insight into attackers' methods and devices used. Such insights are not limited to user agents, time of access, volume of traffic, etc. The security server 1306 may be configured to store and share all the IP addresses, and any additional information identifying the suspicious connections in decoy traffic historian 1306c. Such information may be used by systems to, e.g., drop those connections immediately, continue observing the hacker's activities with respect to those decoy APIs, report those connections via alerts, email and other means of communications, display information dashboards, provide comprehensive reports, etc. It would be understood that by implementing the teachings of FIG. 13, the present disclosure enables rerouting of data messages/data requests from a hacker or attacking client away from a server backend, and into a deception environment created within security server 1306 to continue observing the behaviour of the attacking entity/anomalous entity, or optionally to block such entity completely. By routing such messages and communications from such entity into the deception environment that is implemented external to API gateway 1304 and is implemented within security server 1306, the invention ensures that the entity and its messages are precluded from unauthorized access/causing damage to the API gateway 1304, server backend 1306 or other components of the system.

FIG. 14 illustrates an example system 1400 in which various embodiments, including, for example, one or more proxies within a proxy cluster, one or more access control servers within a access control server cluster, and/or one or more security servers within a security server cluster, may be implemented. In some embodiments, such proxies, access control servers, and/or security servers (as well as other devices described herein) can be implemented as a computer system 102, as described below.

The system 1400 comprises one or more computer system(s) or device(s) 102 (e.g., compute device(s)) comprising at least one processor 1404 and at least one memory 1406. While provided as an example implementation of systems and devices described herein, the computer system 1402 is not intended to suggest any limitation as to scope of use or functionality of described embodiments.

The processor 1404 executes program instructions and may be a real/hardware processor. The processor 1404 may also be a hardware processor implementing a virtual processor. For example, the computer system 1402 may include, but not limited to, one or more of a general purpose computer, a programmed microprocessor, a micro-controller, an integrated circuit, and other devices or arrangements of devices that are capable of implementing the steps that constitute one or more methods as described herein. In embodiments described herein, the processor 1404 can be any suitable processing device configured to run and/or execute a set of instructions or code and may include one or more data processors, image processors, graphics processing units, physics processing units, digital signal processors, and/or central processing units. For example, the processor 1404 may be any suitable processing device configured to run and/or execute functions associated with routing client messages or requests to servers, extracting information from client messages or requests, analyzing and/or implementing security rules or policies, and/or selectively transmitting client messages or requests to servers, and similar functions relating responses received from servers. The processor 1404 may be, for example, a general purpose processor, Field Programmable Gate Array (FPGA), an Application Specific Integrated Circuit (ASIC), and/or the like. The processor 1404 may be configured to run and/or execute application processes and/or other modules, processes and/or functions associated with the system and/or a network associated therewith. The underlying device technologies may be provided in a variety of component types (e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like.

In some embodiments, the memory 1406 may store software for implementing various embodiments as described herein. The memory 1406 may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, and/or the like. The memory 1404 may store instructions to cause the processor 1402 to execute modules, processes, and/or functions.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs), and holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The computer system 1402 can optionally have additional components. For example, the computer system 1402 includes one or more communication channels or interfaces 1408, one or more input devices 1410, one or more output devices 1412, and one or more storage devices 1414. An interconnection mechanism (not shown) such as a bus, controller, or network, interconnects the components of the computer system 1402. In various embodiments, operating system software, e.g., stored in memory 1406 and/or storage device 1414, provides an operating environment for various software executing in the computer system 1402, and manages different functionalities of the components of the computer system 1402.

The communication channel(s) or interface(s) 1408 allow communication over a communication medium to various other computing entities. The communication medium provides information such as program instructions, or other data in a communication media. The communication media includes, but not limited to, wired or wireless methodologies implemented with an electrical, optical, radiofrequency (RF), infrared, acoustic, microwave, Bluetooth or other transmission media. The communication channel(s) or interface(s) 1408 can include a network interface configured to connect the computer system 1402 to another system (e.g., Internet, server, database) by wired or wireless connection. In some embodiments, the communication channel(s) or interface(s) 1408 may be in communication with other devices via one or more wired and/or wireless networks. In some embodiments, the communication channel(s) or interface(s) 1408 can include one or more input and/or output devices such as, for example, input device(s) 1410 and/or output device(s) 1412.

Wireless communication may use any of multiple communication standards, protocols and technologies, including but not limited to, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (WiFi) (e.g., IEEE 802.11a, IEEE 802.11b, IEEE 802.11g, IEEE 802.11n, and the like), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol.

The input device(s) 1410 and/or output device(s) 1412 can be configured to permit a user to control computer system 1402. For example, the input device(s) 1410 and/or output device(s) 1412 can be configured to permit a user to interact with and/or control one or more components of computer system 1402, either directly and/or remotely. The input device(s) 1410 can enable a user to input commands and/or information. The input device(s) 1410 may include, for example, a touch screen, a keyboard, mouse, pen, joystick, trackball, a voice device, a scanning device, or any another device that is capable of providing input to the computer system 1402. In an embodiment, the input device(s) 1410 may be a sound card or similar device that accepts audio input in analog or digital form. The output device(s) 1412 can be configured to output alerts or other information to a user. The output device(s) 1412 may include, for example, a user interface on a display (e.g., a cathode-ray tube (CRT), liquid crystal display (LCD), light emitting diode (LED), electroluminescent display (ELD), plasma display panel (PDP), thin film transistor (TFT), organic light emitting diodes (OLED), electronic paper/e-ink display, laser display, and/or holographic display), printer, speaker, CD/DVD writer, audio device, or any other device that provides output from the computer system 1402.

The storage 1414 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1402. In some embodiments, the storage 1414 can include components similar to those of memory 1404. In various embodiments, the storage 1414 contains program instructions for implementing the described embodiments.

While not illustrated in FIG. 14, the system of FIG. 14 may further include some or all of the components of a switch of the type more fully described in connection with FIG. 4 hereinabove.

In some embodiments, the computer systems (e.g., compute devices) described herein may be in communication with other compute devices via, for example, one or more networks, each of which may be any type of network (e.g., wired network, wireless network). For example, one or more components of a network infrastructure (e.g., API gateway, security server, analysis server, authorization server, etc.), as described herein, can be in communication with one another via such networks. The communication may or may not be encrypted. A wireless network may refer to any type of digital network that is not connected by cables. Examples of wireless communication in a wireless network include, but are not limited to cellular, radio, satellite, and microwave communication. However, a wireless network may connect to a wired network to interface with the Internet, other carrier voice and data networks, business networks, and personal networks. A wired network can be implemented using copper twisted pair, coaxial cable and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, and virtual private networks (VPN). Hereinafter, network refers to any combination of wireless, wired, public and private data networks. Such networks can be interconnected through the Internet, to provide a unified networking and information access system. In some embodiments, the compute devices may communicate with each other (e.g., send data to and/or receive data from) and with the network via intermediate networks and/or alternate networks. Cellular communication may encompass technologies such as GSM, PCS, CDMA or GPRS, W-CDMA, EDGE or CDMA2000, LTE, WiMAX, and 5G networking standards. Some wireless network deployments combine networks from multiple cellular networks or use a mix of cellular, Wi-Fi, and satellite communication.

FIG. 15 depicts an example deployment model 1500 including systems and devices, as described herein, and configured to implement methods as described herein. Example deployment model can be configured to selectively transmit messages (e.g., requests and responses) between client(s) and a server backend, and to analyze information regarding those messages. Client device(s) 1502 can send incoming requests to a load balancer 1504, e.g., via a protocol such as representational state transfer (REST) API. The load balancer 1504 can include any compute device that is configured to distribute incoming traffic from client device(s) 1502 to one or more servers. As depicted in FIG. 15, the load balancer 1504 can be configured to receive input(s) (e.g., resource server request(s)) from the client device(s) 1502 and forward the input(s) to an access control server implemented as an API gateway 1503.

API gateway 1503 can be structurally and/or functionally similar to other access control servers as described herein. For example, API gateway 1503 can include one or more policies (e.g., a PingIntelligence® policy), including security policies, running on API gateway 1503. API gateway 1503 can implement these policies to extract information (e.g., metadata) from client requests. While an API gateway 1503 is illustrated in FIG. 15, it can be appreciated that other types of devices, including web servers, application servers, and other types of compute devices, can be used to perform the functions performed by the API gateway 1503. In some embodiments, API gateway 1503 can be implemented on a load balancer (e.g., load balancer 1504).

The API gateway 1503 is operatively coupled to one or more resource server(s) 1507 configured to provide network resources requested by client device(s) 1503. Resource server(s) 1507 can be structurally and/or functionally similar to other resource server(s) and/or backend server(s) described herein, including, for example, resource server(s) 1007 depicted in FIG. 10A.

The API gateway 1503 is also operatively coupled to a security server 1505 that can be structurally and/or functionally similar to any of the security servers described herein (e.g., 408, 508, 1005, etc.). For example, the security server 1505 can be configured to analyze information associated with input from the client device 1502 as well as information associated with response from the resource server(s) 1507 so as to detect anomalies, indicators of compromise, error codes, and/or blocked connection information. The API gateway 1503 can make an API call to send information associated with request(s) from client device(s) 1502 to the security server 1505 and can receive response(s) from the security server 1505. In some embodiments, the security server 1505 can include Ping Identity® API Security Enforcer, as implemented on one or more compute devices.

The security server 1505 can be operatively coupled to an analysis engine 1510 that can be configured to analyze request(s) from client device(s) 1502 and/or response(s) from resource server(s) 1507, including identifying characteristics or patterns associated with such requests and/or responses to facilitate the security server 1505 in securing communications between client device(s) 1502 and resource server(s) 1507. In some embodiments, analysis engine 1510 can be referred to as an AI engine, and be configured to implement machine learning algorithms, e.g., to identify anomalies and/or indicators of compromise. Analysis engine can be implemented on one or more compute devices. In some embodiments, analysis engine 1510 can include Ping Identity® API Behavior Security, as implemented on one or more compute devices.

In some embodiments, one or more of load balancer 1504, API gateway 1503, security server 1505, analysis engine 1510, etc. can be operatively coupled to a storage or database 1520. Database 1520 can store information regarding requests and/or responses received by security server 1505, analysis engine 1510, etc. Additionally or alternatively, database 1520 can provide data to security server 1505, analysis engine 1510, etc., including, for example, baseline data to analysis engine 1510 to implement machine learning algorithms for identifying anomalies. Additionally or alternatively, database 1520 can be configured to store analysis results acquired by the security server 1505, analysis engine 1510, etc. In some embodiments, data stored in database 1520 and/or acquired by security server 1505, analysis engine 1510, etc. can be provided to a dashboard engine 1532, which can use a search engine 1534, a visualization platform 1536, and/or other data analysis or visualization tools to present information (e.g., information associated with requests from client(s) and/or responses from server(s)) to a user, e.g., via a user interface 1540. In an embodiment, dashboard 1532 can be the PingIntelligence® Dashboard Engine, search engine 1534 can be Elasticsearch, and visualization platform 1536 can be Kibana. User interface 1540 can be, for example, a browser-based graphic user interface (GUI). User interface 1540 can be configured to graphically present data associated with requests from client(s) and/or responses from server(s) to a user.

In some embodiments, the API gateway 1503 can include one or more policies (e.g., a PingIntelligence® policy), including security policies, running on API gateway 1503. In some embodiments, the policies can be configured to collect data and block requests that may pose security hazards. In some embodiments, the policies, when executed or deployed (e.g., by API gateway 1503), collect data from the resource server request and resource server response and correlate the collected data with an ID. In some embodiments, the policies, when executed or deployed (e.g., by the API gateway 1503), can connect to the security server 1505 with SSL or without SSL. In some embodiments, the polices, when executed or deployed (e.g., by API gateway 1503), can operate on keep-alive or separate TCP connections to the security server 1505.

Flow signals 1550(1) to 1550(8), as illustrated in FIG. 15, can be used to describe an implementation of the example deployment model 1500. The load balancer 1504 can receive an incoming request from a client device 1502 and transmit the client request to the API gateway 1503, via 1550(1). The API gateway can make an API call 1550(2) (e.g., including information associated with the client request, such as origin IP, cookie information, token, API key, etc.) to the security server 1505. In some embodiments, the security server 1505 can analyze the information associated with the client request by comparing it to information associated with a registered set of APIs (e.g., provided by the database 1520 and/or stored locally at the security server 1505). In some embodiments, the security server 1505 can be configured to compare the origin IP address, cookie information, token (e.g., OAuth2 token), and/or API key in the client request with a blacklist that includes information of the same parameters associated with attackers. In some embodiments, the blacklist can be substantially similar to any of the blacklists described above (e.g., with reference to FIG. 10B).

When the security server 1505 determines that the client request has passed its security checks (e.g., comparisons to the registered set of APIs and/or blacklist data), the security server 1505 generates a response signal 1550(3) that can include, for example, a 200-OK success status response code or other success code, and sends the response signal 1550(3) to the API gateway 1503. In response to receiving such a response from the security server 1505, the API gateway 1503 can forward the client request, at 1550(4), to a suitable resource server(s) 1507. When the security server 1505 determines that the client request has not passed its security checks, the security server 1505 can generate a response signal 1550(3) that includes, for example, a 403 forbidden error status code or other error code, and send the response signal 1550(3) to the API gateway 1503. In response to receiving such a response from the security server 1505, the API gateway 1503 can be configured to block the client device 1502 (e.g., block transmission of any messages from and/or to the client device 1502). In some embodiments, the information associated with the client request and/or the result of the security checks performed by the security server 1505 can be logged by the security server 1505 and sent to the analysis engine 1510 for further processing (e.g., identification of characteristics and/or patterns associated with the client request and/or client device 1502 and/or updating the engine's anomaly/indicator of compromise detection capabilities).

The resource server(s) 1507, in response to receiving a client request forwarded by the API gateway 1503, can send a response (e.g., a resource server response message), at 1550(5), to the API gateway 1503. In response to receiving the response, the API gateway 1503 can generate and send a second API call 1550(6), including information associated with the response 1550(5), to the security server 1505. In some embodiments, the security server 1505 can perform a security check of the response (e.g., via step 1012 in the method 1050 described with reference to FIG. 10B). If the check passes, the security server 1505 sends a response signal 1550(7) to the API gateway 1505 indicating that there is no risk detected. In this case, the API gateway 1505 can forward the response, at 1550(8), to the client device 1502 via the load balancer 1504. If the check fails (e.g., anomaly or risk detected), the second response 1550(7) can include an instruction to the API gateway 1505 to block the response from being sent to the client device 1502. In this case, the API gateway 1505 can be configured not to send the server response to the client device 1502. In some embodiments, the information associated with the server response and/or the result of the security checks performed by the security server 1505 can be logged by the security server 1505 and sent to the analysis engine 1510 for further processing (e.g., identification of characteristics and/or patterns associated with the response and/or updating the engine's anomaly/indicator of compromise detection capabilities).

FIG. 16 depicts an example deployment model 1600, according to an embodiment. Deployment model 1600 can include components that are functionally and/or structurally similar to those of example deployment model 1500, as well as components associated with an authorization or token server implemented as an OAuth server 1660. Similar to deployment model 1500, in deployment model 1600, an API gateway 1603 is disposed between client device(s) 1602 and resource server(s) 1607. The API gateway 1603 is also in communication with a security server 1605, which in turn is operatively coupled to an analysis engine 1610. A database 1620 is in communication with the analysis engine 1610. The analysis engine 1610 is also configured to provide data to a dashboard 1632, a search engine 1634, a visualization platform 1636, and a user interface 1640, which are collectively configured to manipulate and generate visual representations of the analysis results acquired and/or generated by the security server 1605 and/or analysis engine 1610.

Additionally, client device(s) 1602 and API gateway 1603 can be operatively coupled to an OAuth server 1660. In operation, a client device 1602 is configured to send a token request to the OAuth server 1660 and receives an access token from the OAuth server 1660, at 1650(1). The client device 1602 then sends a client request (also referred to as a resource server request message) together with the access token to the API gateway 1603, at 1650(2). The API gateway 1603 is configured to verify the authenticity of the access token from the client device 1620 by communicating with the OAuth server 1660 (e.g., via 1650(3)) and obtaining attributes including, for example, an username associated with the access token (e.g., a username of a user whose credentials were used to request the access token).

Based on the verification, if the access token associated with the client request is determined to be invalid, the API gateway 1603 is configured to generate and send a response 1650(4) (e.g., a 401—unauthorized access code) to the client device 1602. In some embodiments, the API gateway 1603 is also configured to send information associated with the client request and access token and/or an indication that the associated access token is invalid to the analysis engine 1610 for further processing (e.g., identifying a pattern associated with certain attacking strategies, anomalies, indicators of compromise, etc.).

If the access token associated with the client request is determined to be valid, the API gateway 1603 can implement a policy (e.g., a PingIntelligence® policy running on the API gateway 1603) at 1650(5) to obtain information associated with the client request (e.g., API metadata in the client request, including, for example, attributes of the access token). The API gateway 1603 can be configured to send an API call to the security server 1605 to send the information associated with the client request to the security server 1605, at 1650(6). The information associated with the client request can include, for example, username, origin IP, cookie information, token, and/or API key in the client request. The security server 1605 is configured to perform one or more checks with the information associated with the client request, e.g., comparing the information to that associated with a registered set of APIs and/or with a blacklist (e.g., stored in the database 1620). In some embodiments, the security server 1605 can send the information associated with the client request to the analysis engine 1610 for further processing, similar to that described above for deployment model 1500.

In response the client request passing the checks (e.g., no risk detected by the security server 1605), the security server 1605 sends a response (e.g., 200-OK response) to the API gateway 1603, such that the API gateway 1603 sends the client request from the client device 1602 to a suitable resource server 1607 (e.g., via 1650(7)). In response to receiving the client request, the resource server 1607 can retrieve data requested by the client device 1602 and send a response (also referred to as a resource server response message), at 1650(8). The response from the server can be received at the API gateway 1603, which can send the response to the client 1602. Optionally, in some embodiments, the API gateway 1603 can send the response or information associated with the response to the security server 1605 and/or analysis engine 1610 for security checks and/or analysis, prior to sending the response to the client 1602, at 1650(9).

If the client request does not pass the checks performed by the security server 1605, the security server 1605 sends another response (e.g., 403 forbidden error code) to the API gateway 1603, which blocks the client request from being passed to the resource server(s) 1607. In some embodiments, the API gateway 1602 can also send the client request to the security server 1605 and/or analysis server 1610 (instead of sending to the resource server(s) 1607) for further processing, e.g., for being processed by a decoy API server, as described above.

Information in the resource server response message 1650(8) is configured into a second API call 1650(9) by the API gateway 1603 and sent to the security server 1605 for security check (e.g., via method 1050 described with reference to FIG. 10B). In response to a pass check (i.e., no risk detected), the API gateway 1603 forwards the response 1650(8) to the client device 1602 (e.g., via signal 1650(10). On the other hand, in the event that the check returns one or more anomaly, indicator of compromise, or other risk, the API gateway 1603 can choose to block the client device 1602 and/or send the response 1650(8) to the ABS server 1610 for further processing.

In some embodiments, verification of the access token associated with the client request can be implemented by the API gateway 1603 without communication between the API gateway 1603 and the token server 1660. Instead, the client device 1602 can encode the username (or other attributes of the access token) into the client request, and the API gateway 1603 can be configured to extract or decode the username (or other attributes of the access token) from the received client request. The API gateway 1603 can be configured to check the access token using the decoded username or other attribute information so as to verify the authenticity of the access token.

The present disclosure may be implemented in numerous ways including as a system, a method, or a computer program product such as a computer readable storage medium or a computer network wherein programming instructions are communicated from a remote location.

The present disclosure may suitably be embodied as a computer program product for use with the computer system 1402. The method described herein is typically implemented as a computer program product, comprising a set of program instructions which is executed by the computer system 1402 or any other similar device. The set of program instructions may be a series of computer readable codes stored on a tangible medium, such as a computer readable storage medium (storage 1414), for example, diskette, CD-ROM, ROM, flash drives or hard disk, or transmittable to the computer system 1402, via a modem or other interface device, over either a tangible medium, including but not limited to optical or analogue communications channel(s) 1408. The implementation of the present disclosure as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the example embodiments of the present disclosure are described and illustrated herein, it will be appreciated that they are merely illustrative. It will be understood by those skilled in the art that various modifications in form and detail may be made therein without departing from or offending the spirit and scope of the present disclosure as defined by the appended claims. Additionally, the present disclosure illustratively disclose herein suitably may be practiced in the absence of any element which is not specifically disclosed herein—and in a particular embodiment that is specifically contemplated, the present disclosure is intended to be practiced in the absence of any one or more element which are not specifically disclosed herein.

The invention claimed is:

1. A method, comprising:
   receiving, at an access control server, a server resource request message from a client, the server resource request message requesting information from a server resource;
   extracting server resource request message data from the server resource request message;
   sending the server resource request message data to a security server such that the security server, in response to receiving the server resource request message data, analyzes the server resource request message data to identify whether there is an error, anomaly, or indicator of compromise associated with the server resource request message;

routing, prior to receiving a message from the security server indicating that there is an error, anomaly, or indicator of compromise associated with the server resource request message, the server resource request message and one or more additional server resource request messages subsequently received from the client to a resource server implementing the server resource; and in response to receiving the message from the security server indicating that there is an error, anomaly, or indicator of compromise associated with the server resource request message, blocking server resource request messages subsequently received from the client from being sent to the resource server and responses from the resource server subsequently being sent to the client from being sent to the client.

2. The method of claim 1, wherein the message indicating that there is an error, anomaly, or indicator of compromise is a first message, and the method further comprises:

receiving, from the resource server, a response to the server resource request message;

extracting server resource response message data from the response;

sending the server resource response message data to the security server such that the security server, in response to receiving the server resource response message data, analyzes the server resource response message data to identify whether there is an error, anomaly, or indicator of compromise associated with the server resource response message;

forwarding, prior to receiving the first message or a second message from the security server indicating that there is an error, anomaly, or indicator of compromise associated with the server resource response message, the response and one or more additional responses received in response to the one or more additional server resource request messages to the client; and in response to receiving the second message, blocking server resource request messages subsequently received from the client from being sent to the resource server and responses from the resource server subsequently being sent to the client from being sent to the client.

3. The method of claim 1, wherein the server resource request message data includes at least one of: (i) server resource access request log information stored at the access control server, (ii) server resource access request data transmitted from the access control server, (iii) server resource characteristics data definitions, (iv) configuration data, (v) session data, or (vi) security data associated with the access control server.

4. The method of claim 3, wherein:

the server resource access request data includes one or more of: (i) time stamp information corresponding to one or more communications received at or sent from the access control server, (ii) a connection identifier of the client communicating with the access control server, (iii) a connection identifier of the client communicating with the resource server through the access control server, (iii) a server resource name identified in the server resource request message, (iv) an identification of the resource server to which the server resource request message is to be transmitted by the access control server, (v) an Internet Protocol (IP) address or port of the client; (vi) a method or command used by the client in generating the server resource request message, (vii) a Uniform Resource Locator (URL) and URL information, (viii) protocol information or version number, (ix) content type, (x) host accessed information, (xi) content length, (xii) client information, (xiii) user agent information, (xiv) Application Programming Interface (API) key, or (xv) authorization information including a token or cookie or other data record;

the server resource characteristics data definitions include one or more of: (i) a client side name associated with the server resource, (ii) a server side name associated with the server resource, (iii) hostname associated with the server resource, (iv) an IP address of the server resource, (v) TCP port associated with a server resource on the resource server, (vi) a login URL or secure URL associated with the server resource, (vii) cookie information, (viii) token information, (ix) API key information, (x) communication protocols supported by the server resource, (xi) protocol methods supported by the server resource, (xii) content type supported by the server resource, or (xiii) a data rate limit prescribed in connection with the server resource;

the configuration data includes one or more of: (i) data port information or routing information associated with the resource server, (ii) load balancing or routing policies, (iii) load balancing or routing techniques, (iv) management ports, (v) maximum number of processes or threads for each management port, (vi) policies for generating logs, or (vii) server resource security settings associated with the resource server;

the session data includes one or more of: (i) cookies, (ii) tokens, (iii) client identifiers or (iv) device identifiers; and the security data includes one or more of: (i) cipher suites, (ii) digital certificates, (iii) session keys, or (iv) asymmetric and symmetric ciphers received at the access control server.

5. The method of claim 1, further comprising:

receiving, from the client, an access token with the server resource request message;

verifying whether the access token is valid by communicating with an authentication server; and in response to the access token not being valid, sending a message to the client indicating that the access token is invalid.

6. The method of claim 5, wherein the extracting the server resource request message data is in response to the access token being valid.

7. The method of claim 1, further comprising:

in response to receiving the message from the security server indicating that there is an error, anomaly, or indicator of compromise associated with the server resource request message, sending server resource request messages subsequently received from the client to a decoy server and responses from the decoy server to the client.

8. The method of claim 1, wherein the server resource request message is an application programming interface (API) request, the access control server is an API gateway, and the resource server is an API server, the sending the server resource request message data to the security server includes sending an API call including the server resource request message data to the security server.

9. A computer program product comprising a non-transitory computer usable medium having a computer readable program code embodied therein, the computer readable program code comprising instructions executable by a processor associated with an access control server to:
  extract server resource request message data from a server resource request message received at the access control server from a client, the server resource request message requesting information from a server resource;
  send the server resource request message data to a security server such that the security server, in response to receiving the server resource request message data, analyzes the server resource request message data to identify whether there is an error, anomaly, or indicator of compromise associated with the server resource request message;
  route, prior to receiving a message from the security server indicating that there is an error, anomaly, or indicator of compromise associated with the server resource request message, the server resource request message and one or more additional server resource request messages subsequently received from the client to a resource server implementing the server resource; and
  in response to receiving the message from the security server indicating that there is an error, anomaly, or indicator of compromise associated with the server resource request message, block server resource request messages subsequently received from the client from being sent to the resource server and responses from the resource server subsequently being sent to the client from being sent to the client.

10. The computer program product of claim 9, wherein the message indicating that there is an error, anomaly, or indicator of compromise is a first message, and the instructions further comprise instructions executable by the processor to:
  extract server resource response message data from a response to the server resource request message received from the resource server;
  send the server resource response message data to the security server such that the security server, in response to receiving the server resource response message data, analyzes the server resource response message data to identify whether there is an error, anomaly, or indicator of compromise associated with the server resource response message;
  forward, prior to receiving the first message or a second message from the security server indicating that there is an error, anomaly, or indicator of compromise associated with the server resource response message, the response and one or more additional responses received in response to the one or more additional server resource request messages to the client; and
  in response to receiving the second message, block server resource request messages subsequently received from the client from being sent to the resource server and responses from the resource server subsequently being sent to the client from being sent to the client.

11. The computer program product of claim 9, wherein the instructions further comprise instructions executable by the processor to:
  verify, by communicating with an authentication server, whether an access token received from the client with the server resource request message is valid; and
  in response to the access token not being valid, send a message to the client indicating that the access token is invalid.

12. The computer program product of claim 11, wherein the instruction executable by the processor to extract the server resource request message data includes an instruction to extract the server resource request message data in response to the access token being valid.

13. The computer program product of claim 9, wherein the instructions further comprise instructions executable by the processor to:
  in response to receiving the message from the security server indicating that there is an error, anomaly, or indicator of compromise associated with the server resource request message, send server resource request messages subsequently received from the client to a decoy server and responses from the decoy server to the client.

14. A system, comprising:
  a proxy cluster including a plurality of proxy nodes, each proxy node from the plurality of proxy nodes configured to receive server resource request messages from a plurality of clients and to route the server resource request messages to a plurality of resource servers; and
  an access control server positioned as a communication intermediate between the proxy cluster and the plurality of resource servers, the access control server configured to:
    receive the server resource request messages from the proxy cluster;
    extract server resource request message data from the server resource request messages;
    send the server resource request message data to a security server such that the security server, in response to receiving the server resource request message data, analyzes the server resource request message data to identify whether there is an error, anomaly, or indicator of compromise; and
    in response to receiving a message from the security server indicating that there is an error, anomaly, or indicator of compromise, block one or more of the server resource request messages from being sent to the plurality of resource servers or one or more responses to one or more of the server resource request messages from being sent to the plurality of clients.

15. The system of claim 14, wherein the plurality of proxy nodes is configured to route the server resource request messages to the plurality of resource servers based on routing policies and load balancing policies.

16. The system of claim 14, wherein the access control server is further configured to:
  receive server resource response messages from the plurality of resource servers;
  extract server resource response message data from the server resource response messages; and
  send the server resource response message data to the security server such that the security server, in response to receiving the server resource response message data, analyzes the server resource response message data to identify whether there is an error, anomaly, or indicator of compromise.

17. The system of claim 14, further comprising the security server, the security server configured to:
  send analysis results acquired from analyzing the server resource request message data to an output device such that the output device, in response to receiving the analysis results, generates one or more visual representations of the analysis results.

18. The system of claim 14, further comprising the security server, the security server configured to:
send information associated with the server resource request messages to an analysis engine such that the analysis engine, in response to receiving the information, is configured to process the information to identify a pattern associated with an error, anomaly, or indicator of compromise.

19. The system of claim 14, wherein the access control server is further configured to:
receive, from the plurality of clients, access tokens with the server resource request messages;
verify whether the access tokens are valid by communicating with an authentication server; and
in response to an access token not being valid, send a message indicating that the access token is invalid to the client from which the access token was received.

20. The system of claim 19, wherein the access control server is further configured to send a message indicating that the access token is invalid to the security server.

* * * * *